(12) United States Patent
Kono et al.

(10) Patent No.: US 10,899,190 B2
(45) Date of Patent: Jan. 26, 2021

(54) AIR CONDITIONER

(71) Applicant: DENSO CORPORATION, Kariya (JP)

(72) Inventors: Tetsuya Kono, Kariya (JP); Ryo Kobayashi, Kariya (JP); Yasuhiro Sekito, Kariya (JP); Shinya Kato, Kariya (JP); Yuki Tsumagari, Kariya (JP)

(73) Assignee: DENSO CORPORATION, Kariya (JP)

( * ) Notice: Subject to any disclaimer, the term of this patent is extended or adjusted under 35 U.S.C. 154(b) by 44 days.

(21) Appl. No.: 16/437,084

(22) Filed: Jun. 11, 2019

(65) Prior Publication Data

US 2019/0291531 A1 Sep. 26, 2019

Related U.S. Application Data

(63) Continuation of application No. PCT/JP2017/040491, filed on Nov. 9, 2017.

(30) Foreign Application Priority Data

Dec. 14, 2016 (JP) ................................. 2016-242497

(51) Int. Cl.
| | |
|---|---|
| *B60H 1/00* | (2006.01) |
| *F24F 1/0022* | (2019.01) |
| *F24F 13/08* | (2006.01) |
| *F04D 29/44* | (2006.01) |

(52) U.S. Cl.
CPC .......... *B60H 1/00021* (2013.01); *B60H 1/00* (2013.01); *F04D 29/44* (2013.01); *F24F 1/0022* (2013.01); *F24F 13/082* (2013.01); *B60H 1/00471* (2013.01); *B60H 2001/00092* (2013.01); *B60H 2001/00135* (2013.01)

(58) Field of Classification Search
CPC ................ B60H 1/0021; B60H 1/0064; B60H 2001/00135; B60H 2001/00721; F04D 29/44; F24F 1/0022; F24F 13/082
USPC ........... 454/284, 69–165; 415/203–205, 206, 415/208.1, 211.1
See application file for complete search history.

(56) References Cited

U.S. PATENT DOCUMENTS 5,551,836 A * 9/1996 Roth ................... F04D 29/4213
415/204
2016/0288609 A1 10/2016 Yamaoka et al.

FOREIGN PATENT DOCUMENTS

| JP | H08276722 A | 10/1996 |
| JP | 2016011101 A | 1/2016 |
| JP | 2018001911 A | 1/2018 |

* cited by examiner

*Primary Examiner* — Vivek K Shirsat
(74) *Attorney, Agent, or Firm* — Harness, Dickey & Pierce, P.L.C.

(57) ABSTRACT

An inner guide plate has an inner guide plate surface that guides air. An outer guide plate has an outer guide plate surface that guides the air toward a discharge port of the fan. In each of predetermined cross sections perpendicular to a rotation axis of the fan, a reference line is a line connecting the rotation axis and an outer guide end of the outer guide surface that is a radially inner end. In each of the predetermined cross sections, a guide line is a line connecting the rotation axis and an inner guide end of the inner guide surface that is a radially outer end. In each of the predetermined cross sections, a phase difference angle is an angle between the guide line and the reference line in a rotation direction of the fan. The phase difference angles of the predetermined cross sections are different from each other.

9 Claims, 16 Drawing Sheets

AIR CONDITIONER

CROSS REFERENCE TO RELATED APPLICATIONS

The present application is a continuation application of International Patent Application No. PCT/JP2017/040491 filed on Nov. 9, 2017, which designated the United States and claims the benefit of priority from Japanese Patent Application No. 2016-242497 filed on Dec. 14, 2016. The entire disclosures of all of the above applications are incorporated herein by reference.

TECHNICAL FIELD

The present disclosure relates to an air conditioner for feeding conditioned air.

BACKGROUND

An air conditioner for feeding conditioned air has been known. A conventional air conditioner described is a vehicle air conditioner mounted on a vehicle to feed conditioned air to an interior of the vehicle. The air conditioner includes a fan and an air conditioning case. The air conditioning case contains a ventilation space through which air passes. The fan is disposed in this ventilation space.

The air conditioning case includes a partition plate, an inner guide plate, and an outer guide plate. The inner guide plate is disposed inside a plurality of blade portions in a radial direction of the fan. The outer guide plate is disposed outside the plurality of blade portions in the radial direction of the fan.

The inner guide plate is a member for separating two types of air sucked into the fan, while the outer guide plate is a member for separating the two types of air blown from the fan. The two types of air sucked into the fan are blown from the fan while separated by these inner and outer guide plates.

The air sucked into the fan flows toward the outside in a centrifugal direction of the fan while flowing in a rotation direction of the fan in a process from suction into the fan to discharge to the outside of the fan. In this case, the air passing through the blade portions of the fan flows while changing an advancing angle of the air in a period from suction into the inside of the fan to discharge to the outside of the fan. According to this type of air conditioner, therefore, the outer guide plate is so disposed as to come to a boundary between the two types of air in accordance with a change of the advancing angle.

SUMMARY

According to an aspect of the present disclosure, an air conditioner for feeding conditioned air includes a fan, and an air conditioning case that defines a ventilation space through which air passes. The fan includes a top plate portion, a bottom plate portion, and a plurality of blade portions located between the top plate portion and the bottom plate portion. The fan is disposed in the ventilation space, and rotates to draw the air in a direction along a rotation axis and to blow out the air in a centrifugal direction around the rotation axis. The ventilation space includes a case introduction port through which air outside the air conditioning case is introduced. The air conditioning case includes a partition plate, an inner guide plate, and an outer guide plate.

The partition plate partitions a part of the ventilation space extending from the case introduction port into a first passage and a second passage.

The ventilation space includes: a fan space that communicates with the first passage and the second passage, the fan being disposed in the fan space; a first discharge port that communicates with the fan space, the air that flows through the first passage and the fan space flowing out of the air conditioning case through the first discharge port; and a second discharge port that communicates with the fan space, the air that flows through the second passage and the fan space flowing out of the air conditioning case through the second discharge port.

The top plate portion defines a fan introduction port through which the air passing through the first passage and the air passing through the second passage are introduced into a space surrounded by the bottom plate portion and the top plate portion. The inner guide plate is disposed in the fan space, the inner guide plate being closer to the rotation axis than the plurality of blade portions are to in a radial direction around the rotation axis. The inner guide plate has an inner guide plate surface along which the air passing through the first passage and blown out from the fan is guided toward the first discharge port or the outer guide plate.

The outer guide plate is disposed in the fan space, the outer guide plate being farther from the rotation axis than the plurality of blade portions are from in the radial direction. The outer guide plate has an outer guide plate surface along which the air guided by the inner guide plate surface is guided toward the first discharge port.

A plurality of predetermined cross sections are taken along a direction perpendicular to the rotation axis, each of the plurality of predetermined cross sections includes the fan, and the plurality of predetermined cross sections are different in positions in the direction along the rotation axis each other. In each of the plurality of predetermined cross sections, a reference line is a line that connects the rotation axis and an outer guide end which is one of ends of the outer guide surface closer to the rotation axis in the radial direction.

In each of the plurality of predetermined cross sections, a guide line is a line that connects the rotation axis and an inner guide end which is one of ends of the inner guide surface closer to the outer guide end in the radial direction.

In each of the plurality of predetermined cross sections, a phase difference angle is defined between the guide line and the reference line in a rotation direction of the fan. The phase difference angles of the plurality of predetermined cross sections are different from each other.

According to another aspect of the present disclosure, an air conditioner for feeding conditioned air includes a fan, and an air conditioning case that defines a ventilation space through which air passes. The fan includes a top plate portion, a bottom plate portion, and a plurality of blade portions located between the top plate portion and the bottom plate portion. The fan is disposed in the ventilation space, and rotates to draw the air in a direction along a rotation axis and to blow out the air in a centrifugal direction around the rotation axis.

The ventilation space includes a case introduction port through which air outside the air conditioning case is introduced. The air conditioning case includes a partition plate, an inner guide plate, and an outer guide plate. The partition plate partitions a part of the ventilation space extending from the case introduction port into a first passage and a second passage.

The ventilation space includes: a fan space that communicates with the first passage and the second passage, the fan being disposed in the fan space; a first discharge port that communicates with the fan space, the air that flows through the first passage and the fan space flowing out of the air conditioning case through the first discharge port; and a second discharge port that communicates with the fan space, the air that flows through the second passage and the fan space flowing out of the air conditioning case through the second discharge port.

The top plate portion defines a fan introduction port through which the air passing through the first passage and the air passing through the second passage are introduced into a space surrounded by the bottom plate portion and the top plate portion. The inner guide plate is disposed in the fan space, the inner guide plate being closer to the rotation axis than the plurality of blade portions are to in a radial direction around the rotation axis.

The inner guide plate has an inner guide plate surface along which the air passing through the first passage and blown out from the fan is guided toward the first discharge port or the outer guide plate. The outer guide plate is disposed in the fan space, the outer guide plate being farther from the rotation axis than the plurality of blade portions are from in the radial direction. The outer guide plate has an outer guide plate surface along which the air guided by the inner guide plate surface is guided toward the first discharge port.

A plurality of predetermined cross sections are taken along a direction perpendicular to the rotation axis, each of the plurality of predetermined cross sections includes the fan, and the plurality of predetermined cross sections are different in positions in the direction along the rotation axis each other. In each of the plurality of predetermined cross sections, a line represented by the inner guide surface is a guide line. In each of the plurality of predetermined cross sections, a reference line is a line that connects the rotation axis and an outer guide end which is one of ends of the outer guide surface closer to the rotation axis in the radial direction.

In each of the plurality of predetermined cross sections, a phase difference angle is defined between the guide line and the reference line in a rotation direction of the fan. The phase difference angles of the plurality of predetermined cross sections are different from each other.

EMBODIMENTS

A study of the inventor of the present application has revealed that the two types of air are difficult to sufficiently separate when each of the outer guide plate and the inner guide plate is constituted by a plate extending in a direction parallel to the rotation axis of the fan. A further study has revealed that this difficulty in separation comes from a fact that airs flowing inside the fan and located at different positions in the rotation axis direction have different speeds in the centrifugal direction. In this case, airs flowing from different positions in the rotation axis direction have different lengths of time in the process from suction to the inside of the fan to discharge to the outside of the fan.

For example, when a bottom plate portion of the fan has a flat shape, air on the bottom plate portion side in an internal space of the fan has a larger centrifugal speed component than a centrifugal speed component of air on the top plate portion side in the internal space of the fan. In other words, air located closer to the bottom plate portion in the internal space of the fan has a higher speed in the centrifugal direction.

In addition, when a portion included in the bottom plate portion of the fan and located close to the rotation axis has a protruding shape toward the top plate portion, for example, a centrifugal speed component of air on the bottom plate portion side in the internal space of the fan becomes smaller than a centrifugal speed component of air on the top plate portion side in the internal space of the fan. In other words, air located closer to the bottom plate portion side in the internal space of the fan has a lower speed in the centrifugal direction.

Embodiments according to the present disclosure will be hereinafter described with reference to the drawings. In the respective embodiments described herein, identical or equivalent parts are given identical reference numbers.

First Embodiment

An air conditioner 100 according to a first embodiment of the present disclosure will be described with reference to FIGS. 1 to 6. The air conditioner 100 is a vehicle air conditioner mounted on a vehicle and feeding conditioned air to an interior of the vehicle.

Figure 1:
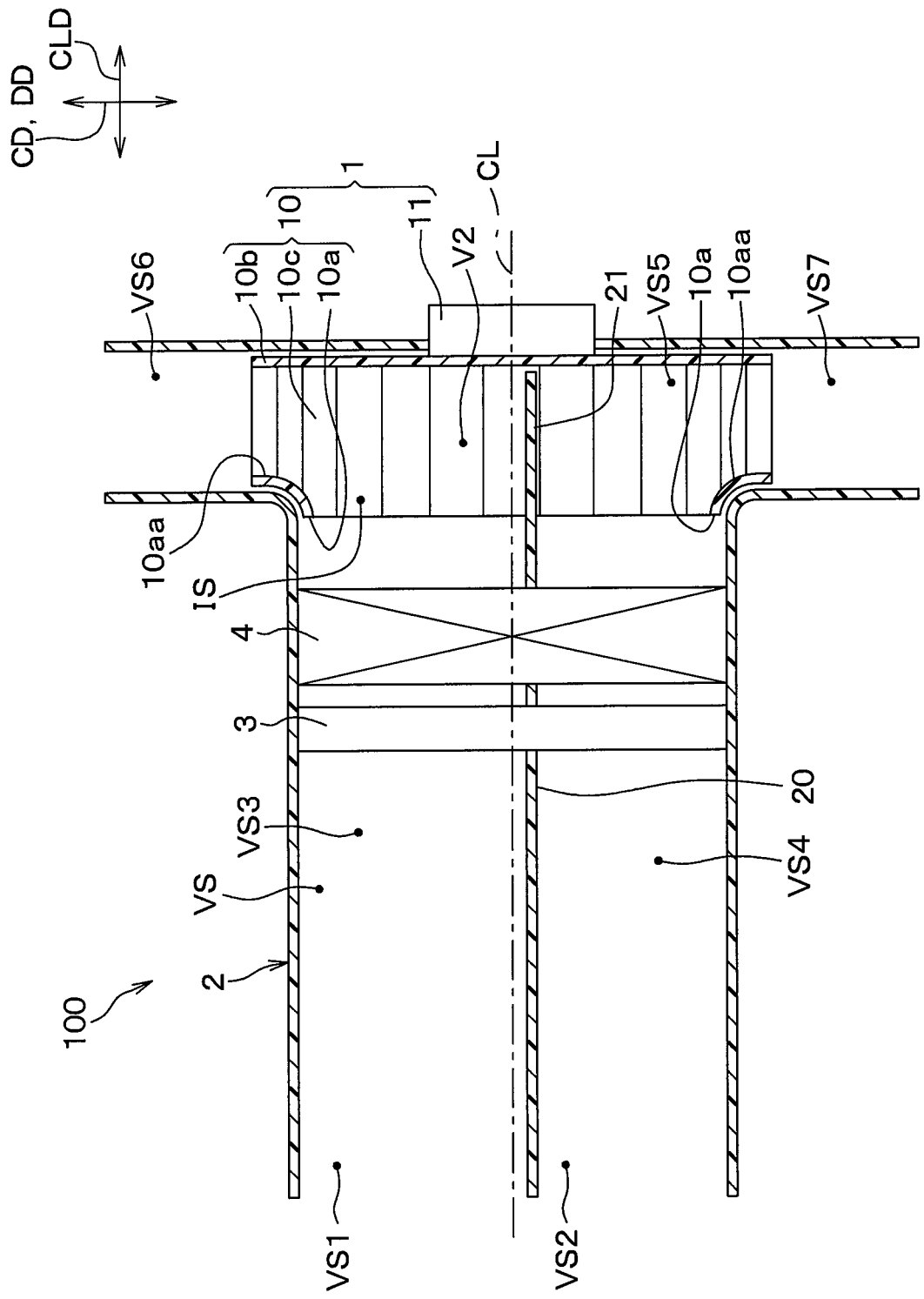
FIG. 1 is a diagram showing an overall configuration of an air conditioner according to at least one embodiment of the present disclosure.

The air conditioner 100 is disposed in a front region inside the vehicle, and constitutes a part of an air conditioning system which includes a refrigeration cycle constituted by a compressor, a condenser, and others disposed in an engine room, for example. As shown in FIG. 1, the air conditioner 100 according to the present embodiment includes a blower 1, an air conditioning case 2, a filter 3, an evaporator 4, a not-shown heater core, and a not-shown electronic control device.

As shown in FIG. 1, the air conditioning case 2 contains ventilation spaces VS1 to VS7 through which air passes. The ventilation spaces VS1 to VS7 include two case introduction ports VS1 and VS2, a first passage VS3, a second passage VS4, a fan space VS5, a first discharge port VS6, and a second discharge port VS7. The case introduction port VS1 is a space through which first air is introduced. Accordingly, the case introduction port VS1 corresponds to a first case introduction port. The case introduction port VS2 is a space through which second air is introduced. Accordingly, the case introduction port VS2 corresponds to a second case introduction port.

The first air is outside air (i.e., air introduced from outside of the vehicle), for example, while the second air is inside air (i.e., air introduced from inside the vehicle), for example. Accordingly, the case introduction port VS1 and the case introduction port VS2 respectively introduce airs having properties different from each other. Arrows AR1 and AR2 in FIG. 2 each indicate a flow of the first air. Arrows AR3 and AR4 in FIG. 2 each indicate a flow of the second air.

As shown in FIG. 1, the first passage VS3 and the second passage VS4 are partial spaces VS3 and VS4 included in the ventilation space VS and divided by a partition plate 20. The first passage VS3 communicates with the case introduction port VS1. The second passage VS4 communicates with the case introduction port VS2. The fan space VS5 is a space which communicates with the first passage VS3 and the second passage VS4, and constitutes a space in which a fan 10 described below is disposed. The first discharge port VS6 is a space through which the first air passing through the first passage VS3 and the fan space VS5 is discharged to the outside of the air conditioning case 2. The second discharge port VS7 is a space through which the second air passing through the second passage VS4 and the fan space VS5 is discharged to the outside of the air conditioning case 2.

The blower 1 is a centrifugal type electric blower. As shown in FIG. 1, the blower 1 includes the fan 10 and a drive motor 11. The blower 1 is disposed in the ventilation spaces VS1 to VS7 formed in the air conditioning case 2. More specifically, the blower 1 is disposed on the air flow downstream side of the filter 3 and the evaporator 4 in the ventilation spaces VS1 to VS7, and on the air flow upstream side of the first discharge port VS6 and the second discharge port VS7.

Figure 2:
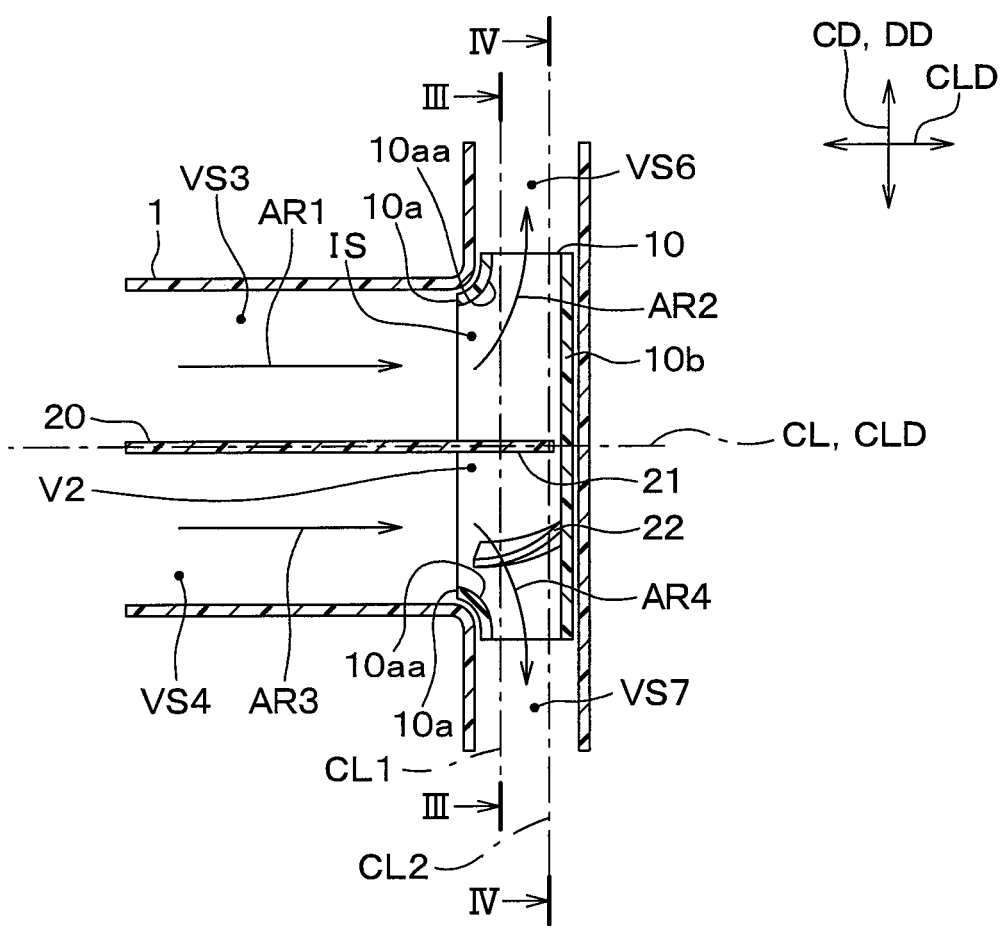
FIG. 2 is a diagram showing a configuration of a peripheral portion of a fan of the air conditioner shown in FIG. 1 in a cross section taken along a line II-II in FIG. 3 or FIG. 4.

As shown in FIGS. 1 and 2, the fan 10 includes a top plate portion 10*a*, a bottom plate portion 10*b*, and a plurality of blade portions 10*c*. As shown in FIG. 2, the fan 10 is disposed in the fan space VS5 of the ventilation spaces VS1 to VS7. The fan 10 rotates to perform a function of sucking air in a direction CLD of a rotation axis CL, and blowing out the air in a centrifugal direction CD around the rotation axis CL.

As shown in FIGS. 1 and 2, the top plate portion 10*a* and the bottom plate portion 10*b* are so disposed as to face each other in the direction CLD corresponding to an extension direction of the rotation axis CL. In the following description, the top plate portion 10*a* side in the direction CLD corresponding to the extension direction of the rotation axis CL is referred to as the upper side, while the bottom plate portion 10*b* side is referred to as the lower side.

As shown in FIGS. 1 and 2, a fan introduction port IS is formed in the top plate portion 10*a* as a port through which air passing through the first passage VS3 and air passing through the second passage VS4 are introduced into a space surrounded by the bottom plate portion 10*b* and the top plate portion 10*a*. A top side guide surface 10*aa* is formed in the top plate portion 10*a* as a guide surface along which air passing through the fan introduction port IS is guided to the first discharge port VS6 or the second discharge port VS7. The top side guide surface 10*aa* faces the bottom plate portion 10*b*. The top side guide surface 10*aa* extends outward in a radial direction DD with nearness to the lower side from the upper side in a periphery of the fan introduction port IS in the radial direction DD. In other words, the top side guide surface 10*aa* is so formed as to come outwardly in the radial direction DD with nearness to the lower side from the upper side in the periphery of the fan introduction port IS in the radial direction DD.

Figure 3:
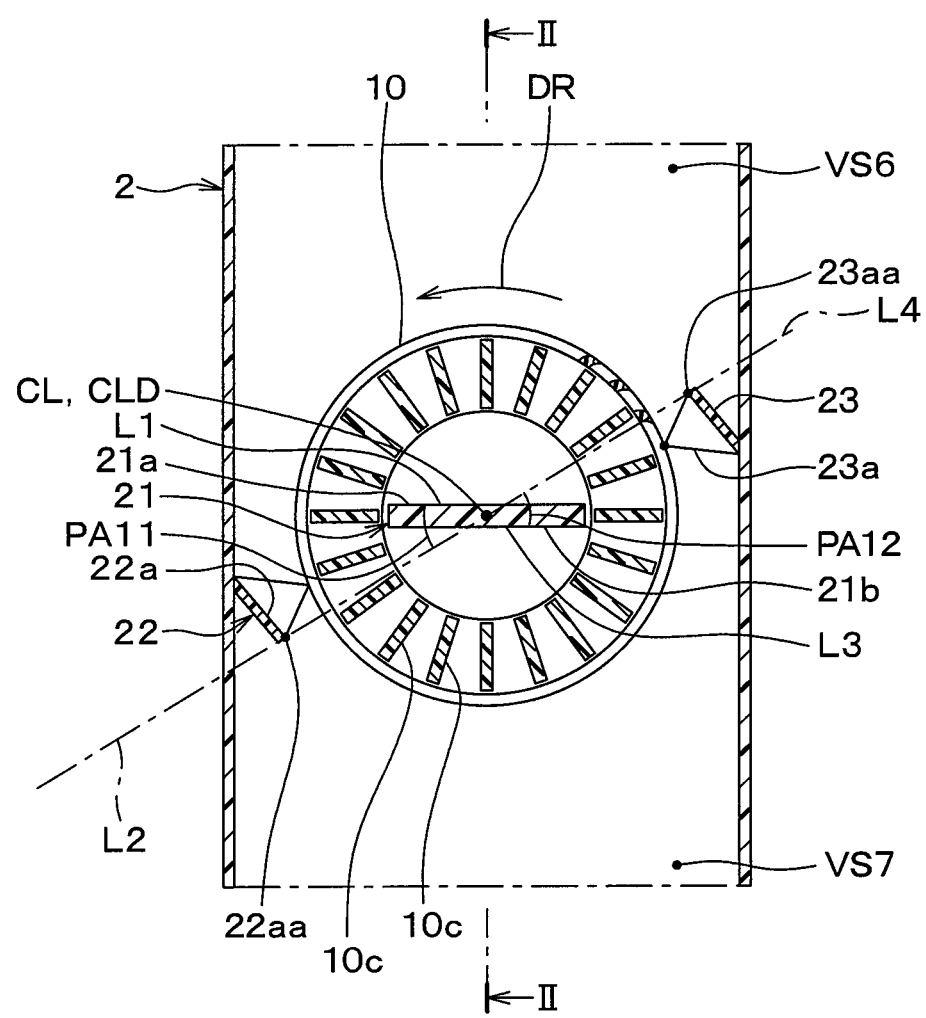
FIG. 3 is a diagram showing a configuration of a cross section taken along a line III-III in FIG. 2.

As shown in FIGS. 1 and 2, a plurality of blade portions 10*c* are surrounded by the top plate portion 10*a* and the bottom plate portion 10*b*. Each of the plurality of blade portions 10*c* is connected to each of the bottom plate portion 10*b* and the top plate portion 10*a*. As shown in FIG. 3, the plurality of blade portions 10*c* are disposed with a clearance left between each other in a rotation direction DR of the fan 10 in a space surrounded by the bottom plate portion 10*b* and the top plate portion 10*a*. The plurality of blade portions 10*c* are disposed outside the fan introduction port IS in the radial direction DD of the fan 10. The radial direction DD of the fan 10 is a direction of a line which passes through a point on the rotation axis CL and is perpendicular to the rotation axis CL.

The drive motor 11 is an electric motor which rotates the fan 10.

As shown in FIG. 1, the air conditioning case 2 is a housing member where the ventilation spaces VS1 to VS7 are formed as spaces through which air passes. The air conditioning case 2 is basically made of resin. The air conditioning case 2 includes the partition plate 20, an inner guide plate 21, an outer guide plate 22, and an outer guide plate 23. The air conditioning case 2 further includes a not-shown door member disposed in the case introduction port VS1, a not-shown door member disposed in the case introduction port VS2, a not-shown door member disposed in the first discharge port VS6, and a not-shown door member disposed in the second discharge port VS7. The air conditioning case 2 further includes a not-shown door member disposed between the evaporator 4 and the heater core in the first passage VS3, and a not-shown door member disposed between the evaporator 4 and the heater core in the second passage VS4.

The partition plate 20 is a plate-shaped member which partitions a part of the ventilation spaces VS1 to VS7 into the first passage VS3 and the second passage VS4. According to the present embodiment, the inner guide plate 21 is formed integrally with the partition plate 20 as shown in FIG. 1.

Arrows DR in FIGS. 3 to 6 each indicate the rotation direction of the fan 10. According to the present embodiment, therefore, the fan 10 rotates counterclockwise in FIGS. 3 to 6.

Figure 4:
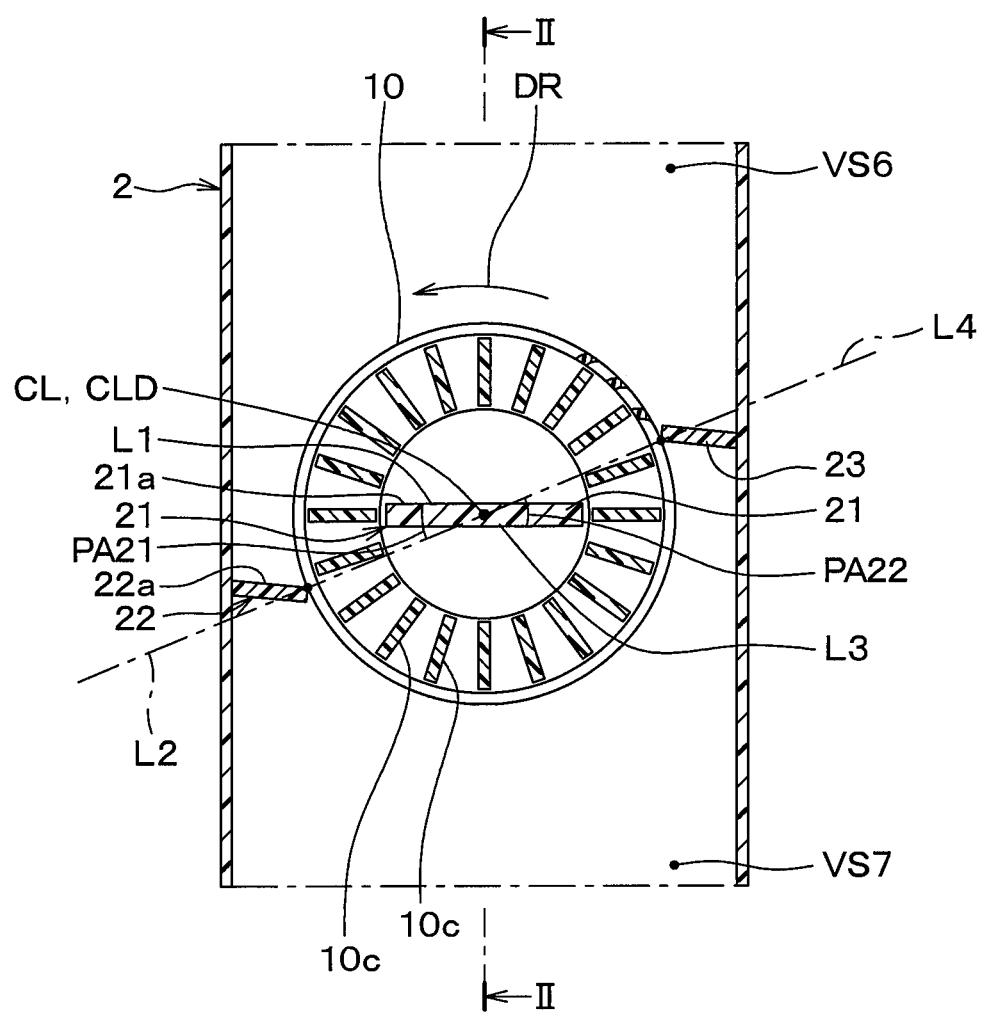
FIG. 4 is a diagram showing a configuration of a cross section taken along a line IV-IV in FIG. 2.

The inner guide plate 21 is a plate-shaped member along which air passing through the first passage VS3 and blown from the fan 10 is guided to the first discharge port VS6 or the outer guide plate 22. In addition, the inner guide plate 21 is a member along which air passing through the second passage VS4 and blown from the fan 10 is guided to the second discharge port VS7 or the outer guide plate 23. As shown in FIGS. 3 and 4, the inner guide plate 21 has a guide surface 21a along which air passing through the first passage VS3 and blown from the fan 10 is guided to the first discharge port VS6 or the outer guide plate 22. The inner guide plate 21 further has a guide surface 21b along which air passing through the second passage VS4 and blown from the fan 10 is guided to the second discharge port VS7. The inner guide plate 21 is disposed inside the plurality of blade portions 10c in the radial direction DD of the fan 10 (i.e., on the side close to the rotation axis CL) in the fan space VS5. The radial direction DD of the fan 10 is a direction which passes through a point CL1 on the rotation axis CL, and is perpendicular to the rotation axis CL. The guide surface 21a corresponds to a first inner guide surface. The guide surface 21b corresponds to a second inner guide surface.

The outer guide plate 22 is a plate-shaped member along which air guided by the guide surface 21a of the inner guide plate 21 is guided to the first discharge port VS6. The outer guide plate 22 has a guide surface 22a along which air guided by the guide surface 21a of the inner guide plate 21 is guided to the first discharge port VS6. The outer guide plate 22 is disposed outside the plurality of blade portions 10c in the radial direction DD of the fan 10 (i.e., on the side away from the rotation axis CL) in the fan space VS5. The outer guide plate 22 corresponds to a first outer guide plate. The guide surface 22a corresponds to a first outer guide surface.

The outer guide plate 23 is a plate-shaped member along which air guided by the guide surface 21b of the inner guide plate 21 is guided to the first discharge port VS6. The outer guide plate 23 has a guide surface 23a along which air guided by the guide surface 21b of the inner guide plate 21 is guided to the second discharge port VS7. The outer guide plate 23 is disposed outside the plurality of blade portions 10c in the radial direction DD of the fan 10 (i.e., on the side away from the rotation axis CL) in the fan space VS5. The outer guide plate 23 corresponds to a second outer guide plate. The guide surface 23a corresponds to a second outer guide surface.

In the following description, any of cross sections each taken in a direction perpendicular to the direction of the rotation axis CL, and each including a region containing the fan 10 is hereinafter referred to as a predetermined cross section. A line represented by the guide surface 21a of the inner guide plate 21 in the predetermined cross section is referred to as a guide line L1. The guide line L1 corresponds to a first guide line. An end of the guide surface 22a of the outer guide plate 22 on the side close to the rotation axis CL in the radial direction DD in the predetermined cross section is referred to as an outer guide end 22aa. The outer guide end 22aa therefore corresponds to a first outer guide end. Accordingly, the guide line L1 is substantially equivalent to a line which connects the rotation axis CL and an end of the guide surface 21a on the side close to the outer guide end 22aa of the outer guide plate 22a in the radial direction DD (i.e., inner guide end). A line which connects the rotation axis CL and the outer guide end 22aa in the predetermined cross section is referred to as a reference line L2. The reference line L2 therefore corresponds to a first reference line. An angle measured from the guide line L1 to the reference line L2 in a rotation direction DR1 of the fan 10 in the predetermined cross section is referred to as a first phase difference angle. A line represented by the guide surface 21b of the inner guide plate 21 in the predetermined cross section is referred to as a guide line L3. The guide line L3 therefore corresponds to a second guide line. An end of the guide surface 23a of the outer guide plate 23 in the predetermined cross section on the side close to the rotation axis CL in the radial direction DD is referred to as an outer guide end 23aa. In this case, the outer guide end 23aa corresponds to a second outer guide end. Accordingly, the guide line L3 is substantially equivalent to a line which connects the rotation axis CL and an end of the guide surface 21b on the side close to the outer guide end 23aa of the outer guide plate 23a in the radial direction DD (i.e., inner guide end). A line which connects the rotation axis CL and the outer guide end 23aa in the predetermined cross section is referred to as a reference line L4. The reference line L4 therefore corresponds to a second reference line. An angle measured from the guide line L3 to the reference line L4 in the rotation direction DR1 of the fan 10 in the predetermined cross section is referred to as a second phase difference angle.

The first phase difference angle is set to such an angle at which the first air guided by the guide surface 21a of the inner guide plate 21 can reach a periphery of the outer guide plate 22, and such an angle at which the second air guided by the guide surface 21b of the inner guide plate 21 cannot reach the periphery of the outer guide plate 22. More specifically, the first phase difference angle is set to such an angle that the outer guide end 22aa is located at a position close to the boundary between the first air and the second air in the corresponding predetermined cross section. Similarly, the second phase difference angle is set to such an angle at which the second air guided by the guide surface 21b of the inner guide plate 21 can reach a periphery of the outer guide plate 23, and such an angle at which the first air guided by the guide surface 21a of the inner guide plate 21 cannot reach the periphery of the outer guide plate 23. More specifically, the second phase difference angle is set to such an angle that the outer guide end 23aa is disposed at a position close to the boundary between the first air and the second air in the corresponding predetermined cross section.

Figure 5:
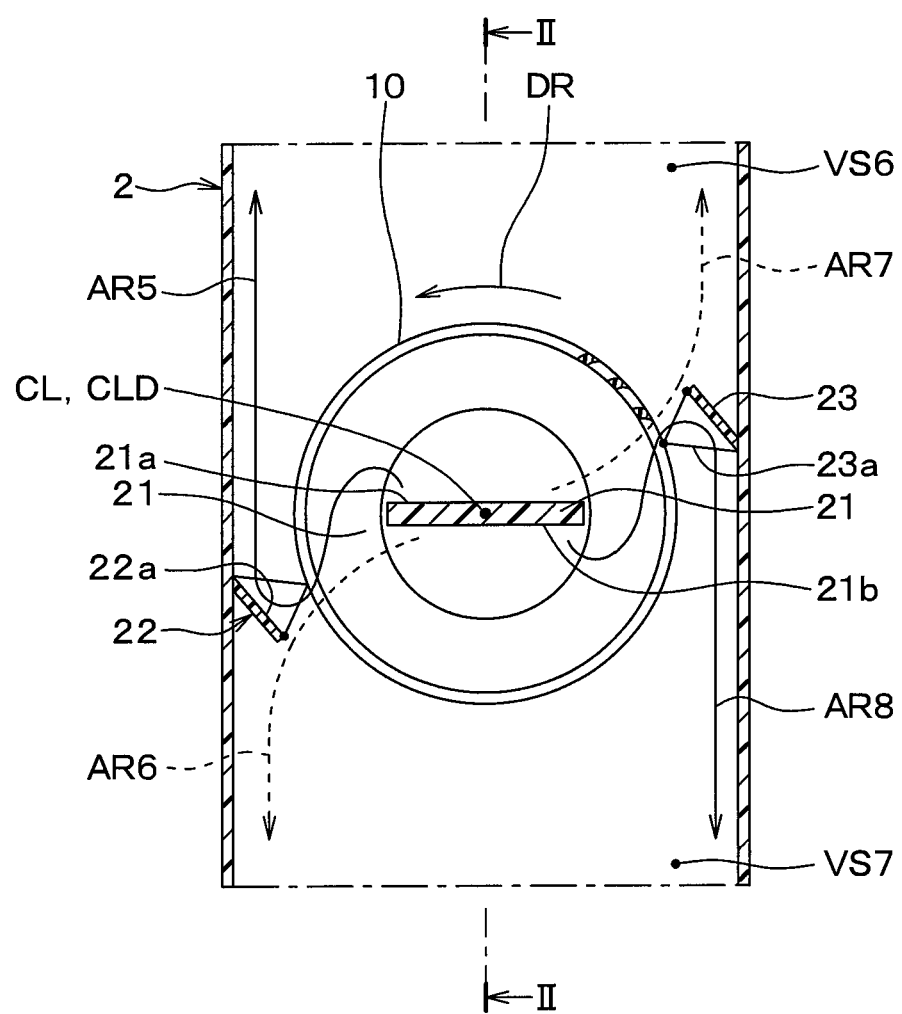
FIG. 5 is another diagram showing the configuration of the cross section taken along the line III-III in FIG. 2.
Figure 6:
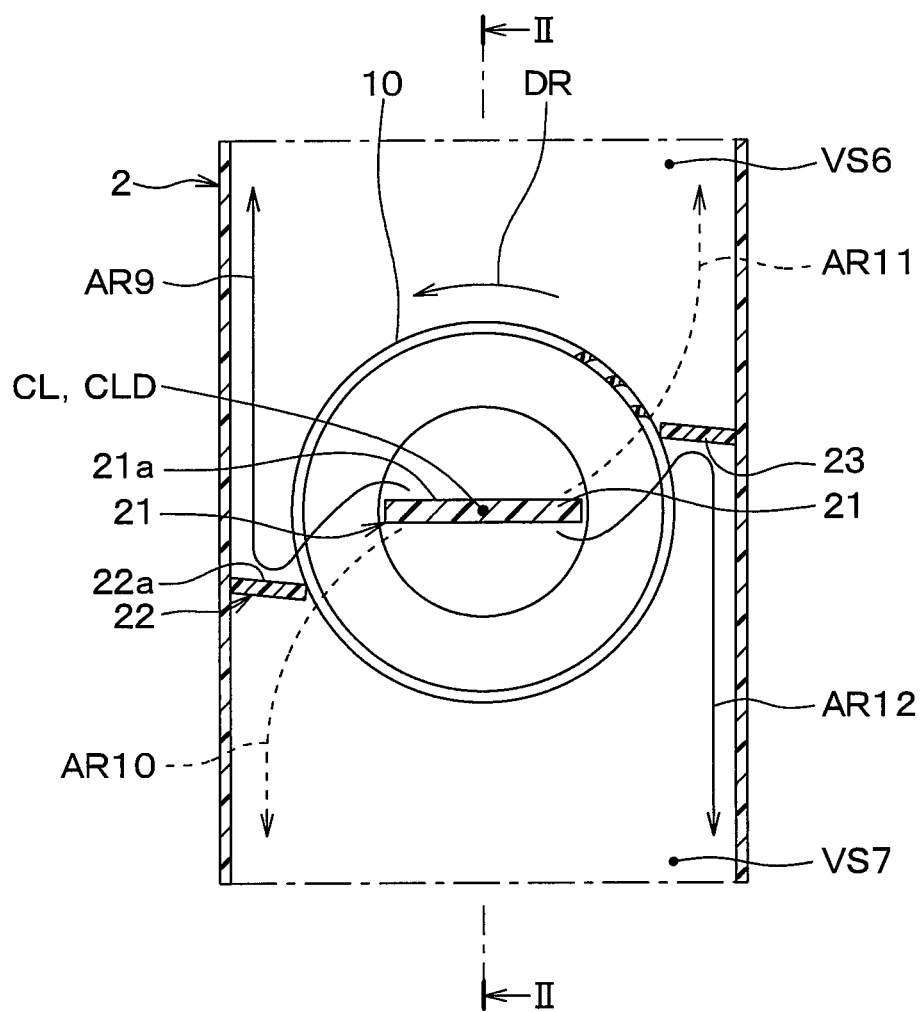
FIG. 6 is another diagram showing the configuration of the cross section taken along the line IV-IV in FIG. 2.

Phase change portions 21a and 22aa, and phase change portions 21a and 23a, each of which corresponds to a characteristic part of the air conditioner 100 according to the present embodiment, will be now described with reference to FIGS. 2 to 6. FIG. 3 shows a cross-sectional configuration of a peripheral portion of the fan 10 in the air conditioning case 2, taken at a predetermined position CL1 in the direction CLD of the rotation axis CL in FIG. 1. FIG. 4 shows a cross-sectional configuration of the peripheral portion of the fan 10 in the air conditioning case 2, taken at a predetermined position CL2 in the direction CLD of the rotation axis CL in FIG. 1. The predetermined position CL2 is a position lower than the predetermined position CL1. FIG. 5 shows a cross-sectional configuration of the peripheral portion of the fan 10 in the air conditioning case 2, illustrating the same cross-sectional configuration as that of FIG. 3, i.e., taken at the predetermined position CL1. FIG. 6 shows a cross-sectional configuration of the peripheral portion of the fan 10 in the air conditioning case 2, illustrating the same cross-sectional configuration as that of FIG. 4, i.e., taken at the predetermined position CL2. Arrows AR5 and AR7 in FIG. 5 each indicate a flow of the first air. Arrows AR6 and AR8 in FIG. 5 each indicate a flow of the second air. Arrows AR9 and AR11 in FIG. 6 each indicate a flow of the first air. Arrows AR10 and AR12 in FIG. 6 each indicate a flow of the second air. In FIGS. 5 and 6, the blade portions 10c are not shown.

According to the present embodiment, the lower side of the flat plate shape of the outer guide plate 22 is bent oppositely to the rotation direction DR of the fan as shown in FIGS. 2 to 4. More specifically, the outer guide plate 22 of the present embodiment has such a bent shape that the outer guide end 22aa shifts in the direction opposite to the rotation direction DR of the fan 10 with nearness to the lower side from the upper side. In other words, the outer guide plate 22 is twisted oppositely to the rotation direction DR with nearness to the lower side from the upper side. Meanwhile, the inner guide plate 21 of the present embodiment has a flat-plate shape extending in a direction parallel to the rotation axis CL. More specifically, the inner guide plate 21 of the present embodiment has a flat plate shape, and is disposed such that the guide surface 21a extends in a direction parallel to the rotation axis CL.

According to the present embodiment, therefore, a phase difference angle PA21 shown in FIG. 4 is smaller than a phase difference angle PA11 shown in FIG. 3. Accordingly, the air conditioning case 2 of the present embodiment has such a configuration that the phase difference angle PA21 at the predetermined position CL2 on the lower side is smaller than the phase difference angle PA11 at the predetermined position CL1 on the upper side. More specifically, the air conditioning case 2 of the present embodiment is configured such that the phase difference angle decreases with nearness to the lower side from the upper side. The phase difference angle PA11 is set such that the outer guide end 22aa is located at a position close to the boundary between the first air and the second air in the predetermined cross section corresponding to the predetermined position CL1. The phase difference angle PA21 is set such that the outer guide end 22aa is located at a position close to the boundary between the first air and the second air in the predetermined cross section corresponding to the predetermined position CL2.

According to the air conditioner 100 of the present embodiment, therefore, the air conditioning case 2 has the different phase difference angles PA11 and PA21 at the different positions CL1 and CL2 in the direction CLD of the rotation axis CL. Portions included in the air conditioning case 2 and forming different phase difference angles at different positions in the direction CLD of the rotation axis CL will be hereinafter referred to as phase change portions.

As described above, the air conditioner 100 according to the present embodiment includes the phase change portions 21a and 22a which form different phase difference angles at different positions in the direction CLD of the rotation axis CL. More specifically, the phase change portions 21a and 22a form phase difference angles which decrease with nearness to the lower side from the upper side.

Accordingly, the air conditioner 100 of the present embodiment which has the phase change portions 21a and 22a can cope with upper air having a small speed component in the centrifugal direction CD, and lower air having a large speed component in the centrifugal direction CD. Accordingly, the first air and the second air can be appropriately separated on the lower side as shown in FIG. 6. Furthermore, the phase difference angle increases with nearness to the upper side. In this case, the first air flowing to a position advanced in the rotation direction DR is securely guided by the guide surface 22a of the outer guide plate 22 also on the upper side as shown in FIG. 5, wherefore the first air and the second air can be appropriately separated. This separation is achievable for the following reason.

A study by the inventor has revealed that two types of air may be difficult to sufficiently separate when a fan, an inner guide plate, and an outer guide plate are used. A further study has revealed that this difficulty in separation comes from a fact that airs flowing inside the fan and located at different positions in the rotation axis direction have different speeds in the centrifugal direction.

It is also assumed that the difference in speed is produced in a state that air introduced into an inlet of the fan and flowing in the centrifugal direction along the top side guide surface does not flow in close contact with the top side guide surface, but flows downward while separated from the top side guide face. It is therefore assumed that the air concentrates on the lower part of the internal space of the fan (i.e., on the side away from the top side guide surface).

Accordingly, when the top plate portion 10a side surface of the bottom plate portion 10b is a flat surface as in the present embodiment, the speed component of the lower air in the centrifugal direction in the internal space of the fan becomes larger than the speed component of the upper air in the centrifugal direction in the internal space of the fan. The upper side herein refers to the top plate portion side in the rotation axis direction. The lower side refers to the bottom plate portion side in the rotation axis direction. In other words, air located on the lower side in the internal space of the fan has a higher speed in the centrifugal direction. The upper air in the internal space of the fan will be hereinafter referred to as upper air, while the lower air in the internal space of the fan will be referred to as lower air. As described above, the rotational speed component of the air flowing inside the fan is basically small and ignorable as compared with the centrifugal speed component, wherefore the difference in the rotational speed component between the upper air and the lower air is small at an ignorable level.

The speed component of the lower air in the centrifugal direction therefore becomes larger than the speed component of the upper air in the centrifugal direction. Accordingly, a larger amount of air flowing on the upper side in the vicinity of the boundary between the first air and the second air therefore moves in the rotation direction than the amount of the air flowing on the lower side in the vicinity of the boundary between the first air and the second air and moving in the rotation direction. The air moving in the rotation direction on the upper side is then discharged to the outside of the fan.

Figure 20:
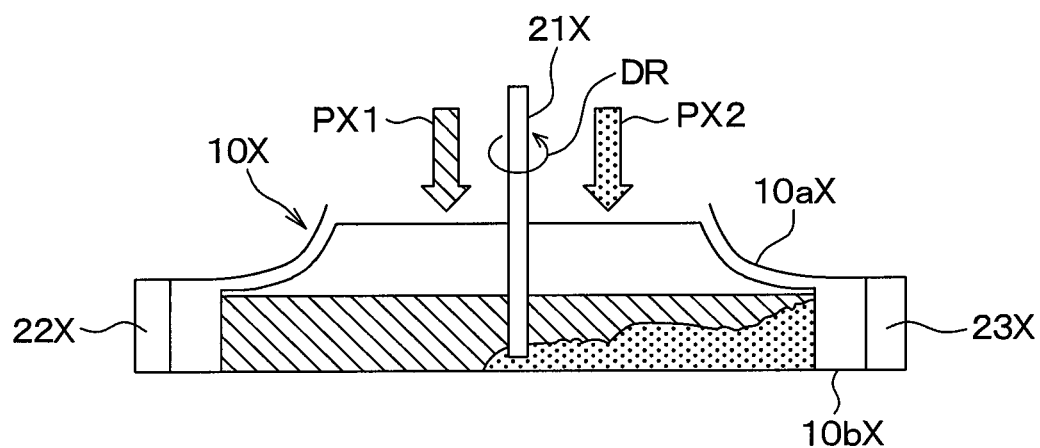
FIG. 20 is a diagram showing flows of first and second airs in a comparative example.

Described herein is a comparative example shown in FIG. 20, which adopts plate-shaped members constituting an inner guide plate 21X and outer guide plates 22X and 22Y, each extending in a direction parallel to the rotation axis. In this comparative example, a fan 10X, a top plate portion 10aX, a bottom plate portion 10bX, the inner guide plate 21X, the outer guide plate 22X, and the outer guide plate 23X have functions substantially equivalent to the functions of the fan 10, the top plate portion 10a, the bottom plate portion 10b, the inner guide plate 21, the outer guide plate 22, and the outer guide plate 23, respectively. However, the inner guide plate 21X, the outer guide plate 22X, and the outer guide plate 23X are flat plate members each extending in a direction parallel to the rotation axis, unlike the corresponding components in the above embodiment. In FIG. 20, a plurality of blade portions of the fan 10X are not shown.

FIG. 20 shows distributions of the first air PX1 and the second air PX2 at an air outlet of the fan 10X, i.e., at a position farthest from the rotation axis of the fan 10X in a space surrounded by the plurality of blade portions of the fan 10X. An existence region of the first air PX1 is expressed by oblique hatching, while an existence region of the second air PX2 is expressed by point hatching. The first air PX1 and the second air PX2 each have properties equivalent to those of the first air and the second air of the embodiment described above, respectively.

According to this comparative example, the speed component of the lower air in the centrifugal direction similarly becomes larger than the speed component of the upper air in the centrifugal direction. A larger amount of air flowing on the upper side in the vicinity of the boundary between the first air PX1 and the second air PX2 therefore moves in the rotation direction than the amount of the air flowing on the lower side in the vicinity of the boundary between the first air PX1 and the second air PX2 and moving in the rotation direction. The air moving in the rotation direction on the upper side is then discharged to the outside of the fan.

Accordingly, air guided by the first inner guide surface of the inner guide plate and flowing toward the outer guide plate on the upper side is not guided by the outer guide plate but flows to the discharge port in some cases. For a similar reason, the two types of air PX1 and PX2 are difficult to appropriately separate on the lower side when the outer guide plates 22X and 23X are located at positions close to the boundary between the two types of air on the upper side as in the comparative example of FIG. 20.

According to the configuration of the present embodiment, the air flowing on the upper side in the internal space of the fan 10 (hereinafter referred to as upper air) has a small speed component in the centrifugal direction CD, while the air flowing on the lower side (hereinafter referred to as lower air) has a large speed component in the centrifugal direction CD. In this case, the distance of the upper air in the rotational direction DR increases. More specifically, according to this configuration, the distance of the flow of the upper air in the rotation direction DR from the inside of the fan 10 to the outside (i.e., in the centrifugal direction CD) until discharge to the outside of the fan 10 is longer than that distance of the lower air. According to this configuration, therefore, the first air and the second air are difficult to sufficiently separate as described above when each of the inner guide plate and the first outer guide plate has a plate shape extending in a direction parallel to the rotation axis. More specifically, when the inner guide plate 21 and the outer guide plate 22 are disposed at positions corresponding to the position of the boundary between the first air and the second air on the lower side in this configuration, for example, the boundary of the upper air is located at a position advanced in the rotation direction DR from the boundary of the lower air. Accordingly, a part of the upper air is not guided by the outer guide plate 22 but flows to the second discharge port VS7.

According to the air conditioner 100 of the present embodiment, however, the phase difference angle decreases with nearness to the lower side from the upper side. In other words, the phase difference angle increases from the lower side to the upper side. Accordingly, the air conditioner 100 of the present embodiment appropriately achieves separation between the first air and the second air on both the upper side and the lower side. Separation between the first air and the second air is therefore appropriately achievable on the lower side as shown in FIG. 6. Moreover, the phase difference angle increases with nearness to the upper side. In this case, the first air located on the upper side and flowing to a position advanced in the rotation direction DR from the air on the lower side can also be securely guided by the guide surface 22a of the outer guide plate 22 as shown in FIG. 5. Accordingly, separation between the first air and the second air is appropriately achievable. Furthermore, the outer guide plate 22 has a bent shape as described above. In this case, the upper air and the lower air, which are introduced into the fan 10 and flow substantially at the same time in the centrifugal direction CD, come to collide with the guide surface 22a at different timings, respectively. Accordingly, the upper air and the lower air collide with the guide surface 22a with variance in time and position, wherefore noise generated by collision between these airs and the guide surface 22a decreases.

According to the present embodiment, the lower side of the flat plate shape of the outer guide plate 23 is also bent oppositely to the rotation direction DR of the fan as shown in FIGS. 2 to 4. More specifically, the outer guide plate 23 of the present embodiment has such a bent shape that the outer guide end 23aa shifts in the direction opposite to the rotation direction DR of the fan 10 with nearness to the lower side from the upper side. In other words, the outer guide plate 23 is twisted oppositely to the rotation direction DR with nearness to the lower side from the upper side. According to the present embodiment, the inner guide plate 21 has a flat-plate shape extending in the direction parallel to the rotation axis CL as described above. More specifically, the inner guide plate 21 of the present embodiment has a flat plate shape, and is disposed such that the guide surface 21b extends in a direction parallel to the rotation axis CL.

According to the present embodiment, therefore, the phase difference angle PA22 shown in FIG. 4 is smaller than the phase difference angle PA21 shown in FIG. 3. Accordingly, the air conditioning case 2 of the present embodiment has such a configuration that the phase difference angle PA22 at the predetermined position CL2 on the lower side is smaller than the phase difference angle PA21 at the predetermined position CL1 on the upper side. More specifically, the air conditioning case 2 of the present embodiment is configured such that the phase difference angle decreases with nearness to the lower side from the upper side. The phase difference angle PA21 is set such that the outer guide end 23aa is located at a position close to the boundary between the first air and the second air in the predetermined cross section corresponding to the predetermined position CL1. The phase difference angle PA22 is set such that the outer guide end 23aa is located at a position close to the boundary between the first air and the second air in the predetermined cross section corresponding to the predetermined position CL2.

According to the air conditioner 100 of the present embodiment, therefore, the air conditioning case 2 has the different phase difference angles PA21 and PA22 at the different positions CL1 and CL2 in the direction CLD of the rotation axis CL.

As described above, the air conditioner 100 according to the present embodiment includes the phase change portions 21a and 23a forming the different phase difference angles PA21 and PA22 at the different positions CL1 and CL2 in the direction CLD of the rotation axis CL. More specifically, the phase difference angle of the phase change portions 21*a* and 23*a* decreases with nearness to the lower side from the upper side.

The air conditioner 100 of the present embodiment therefore includes the phase change portions 21*a* and 23*a* for a purpose similar to the purpose of the phase change portions 21*a* and 22*a* described above. The air conditioner 100 therefore can cope with the upper air having a small speed component in the centrifugal direction CD, and the lower air having a large speed component in the centrifugal direction CD. Accordingly, the first air and the second air can be appropriately separated on the lower side as shown in FIG. 6. Furthermore, the phase difference angle increases with nearness to the upper side. In this case, as shown in FIG. 5, the first air flowing to a position advanced in the rotation direction DR can be securely guided by the guide surface 23*a* of the outer guide plate 23 also on the upper side, wherefore the first air and the second air can be appropriately separated. Furthermore, the outer guide plate 23 has a bent shape as described above. In this case, the upper air and the lower air, which are introduced into the fan 10 and flow substantially at the same time in the centrifugal direction CD, come to collide with the guide surface 23*a* at different timings, respectively. Accordingly, the upper air and the lower air collide with the guide surface 23*a* with variance in time and position, wherefore noise generated by collision between these airs and the guide surface 23*a* decreases.

The not-shown door member disposed at the case introduction port VS1 revolves to open and close the case introduction port VS1. Accordingly, the air conditioner 100 of the present embodiment can increase or decrease the amount of the first air (i.e., outside air), which is introduced to the inside of the air conditioning case 2 from the case introduction port VS1, in accordance with revolution of the revolving door.

The not-shown door member disposed at the case introduction port VS2 revolves to open and close the case introduction port VS2. Accordingly, the air conditioner 100 of the present embodiment can increase or decrease the amount of the second air (i.e., inside air), which is introduced to the inside of the air conditioning case 2 from the case introduction port VS2, in accordance with revolution of the revolving door.

The not-shown door member disposed at the first discharge port VS6 revolves to open and close the first discharge port VS6. Accordingly, the air conditioner 100 of the present embodiment can increase or decrease the amount of the first air (i.e., outside air), which is discharged to the outside of the air conditioning case 2 from the first discharge port VS6, in accordance with revolution of the revolving door.

The not-shown door member disposed at the second discharge port VS7 revolves to open and close the second discharge port VS7. Accordingly, the air conditioner 100 of the present embodiment can increase or decrease the amount of the second air (i.e., inside air), which is discharged to the outside of the air conditioning case 2 from the second discharge port VS7, in accordance with revolution of the revolving door.

The not-shown door member disposed between the evaporator 4 and the heater core in the first passage VS3 is slidable. The door member slides to adjust the amount of the first air passing through the evaporator 4 by increasing or decreasing the amount of air passing through the passage on the side passing through the heater core, and the amount of air passing through the passage on the side not passing through the heater core (i.e., bypass passage).

The not-shown door member disposed between the evaporator 4 and the heater core in the second passage VS4 is slidable. The door member slides to adjust the amount of the second air passing through the evaporator 4 by increasing or decreasing the amount of air passing through the passage on the side passing through the heater core, and the amount of air passing through the passage on the side not passing through the heater core (i.e., bypass passage).

The not-shown heater core is a heating heat exchanger which heats air by heat exchange between engine cooling water, which is warm water circulating inside the heater core, and air passing through the heater core. As shown in FIG. 1, the heater core is disposed on the air flow downstream side of the evaporator 4 in the ventilation space VS and on the air flow upstream side of the fan 10. The heater core is disposed in contact with each of the first passage VS3 and the second passage VS4.

The filter 3 is a filter having a function of dust prevention, deodorization, sterilization, or the like. As shown in FIG. 1, the filter 3 is disposed on the air flow downstream side of the case introduction port VS1 and the case introduction port VS2 of the ventilation spaces VS1 to VS7, and on the air flow upstream side of the evaporator 4 and the fan 10. The filter 3 is disposed in contact with each of the first passage VS3 and the second passage VS4.

The evaporator 4 is a cooling heat exchanger which cools air by heat exchange between a refrigerant circulating inside the evaporator 4 and air passing through the ventilation spaces VS1 to VS7. As shown in FIG. 1, the evaporator 4 is disposed on the air flow downstream side of the case introduction port VS1 and the case introduction port VS2 of the ventilation spaces VS1 to VS7, and on the air flow upstream side of the fan 10. The evaporator 4 is disposed in contact with each of the first passage VS3 and the second passage VS4.

The not-shown electronic control device is constituted by a known microcomputer including a central processing unit (CPU), a read-only memory (ROM), a random-access memory (RAM), and the like, and peripheral circuits of the microcomputer, and executes various control processes under a computer program prestored in the ROM or the like. Actuators are respectively connected to the above-described door members disposed in the air conditioning case 2 to drive the corresponding doors. The not-shown electronic control unit outputs operation signals to the respective actuators to revolve or slide the associated doors. The not-shown electronic control unit also outputs operation signals to the blower 1 and a not-shown compressor for circulating the refrigerant to the evaporator 4. The not-shown electronic control unit executes various types of air conditioning control in the air conditioner 100.

As described above, the air conditioning case 2 of the air conditioner 100 according to the present embodiment has different phase difference angles at different positions in the direction CLD of the rotation axis CL. More specifically, the air conditioner 100 according to the present embodiment has the phase change portions 21*a* and 22*a* which form different phase difference angles at different positions in the direction CLD of the rotation axis CL.

Accordingly, the air conditioner 100 of the present embodiment which has the phase change portions 21*a* and 22*a* can cope with upper air having a small speed component in the centrifugal direction CD, and lower air having a large speed component in the centrifugal direction CD. In this configuration, the phase difference angle increases with nearness to the upper side, wherefore the first air and the second air can be appropriately separated on the lower side.

Moreover, the first air flowing to a position advanced in the rotation direction can be securely guided by the guide surface 22a of the outer guide plate 22 also on the upper side. Accordingly, separation between the first air and the second air is appropriately achievable. Furthermore, the outer guide plate 22 has a bent shape as described above. In this case, the upper air and the lower air, which are introduced into the fan 10 and flow substantially at the same time in the centrifugal direction CD, come to collide with the guide surface 22a at different timings, respectively. Accordingly, the upper air and the lower air collide with the guide surface 22a with variance in time and position, wherefore noise generated by collision between these airs and the guide surface 22a decreases.

In addition, the air conditioner 100 according to the present embodiment has the phase change portions 21a and 23a which form different phase difference angles at different positions in the direction CLD of the rotation axis CL.

Accordingly, the air conditioner 100 of the present embodiment which includes the phase change portions 21a and 23a can cope with upper air having a small speed component in the centrifugal direction CD, and lower air having a large speed component in the centrifugal direction CD, similarly to the above configuration including the phase change portions 21a and 22a. In this configuration, the phase difference angle increases with nearness to the upper side, wherefore the first air and the second air can be appropriately separated on the lower side. Moreover, the first air flowing to a position advanced in the rotation direction DR can be also securely guided by the guide surface 23a of the outer guide plate 23 on the upper side. Accordingly, separation between the first air and the second air is appropriately achievable. Furthermore, the outer guide plate 23 has a bent shape as described above. In this case, the upper air and the lower air, which are introduced into the fan 10 and flow substantially at the same time in the centrifugal direction CD, come to collide with the guide surface 23a at different timings, respectively. Accordingly, the upper air and the lower air collide with the guide surface 23a with variance in time and position, wherefore noise generated by collision between these airs and the guide surface 23a decreases.

According to the present embodiment, the top plate portion 10a has the top side guide surface 10aa along which air passing through the fan introduction port IS is guided to the first discharge port VS6 or the second discharge port VS7. The top side guide surface 10aa faces the bottom side portion 10b, and extends outward in the radial direction DD with nearness to the lower side from the upper side in the periphery of the fan introduction port IS in the radial direction DD.

As is apparent from the above description such as the effects of the phase change portions 21a, 22a or the phase change portions 21a and 23a, the configuration having the phase change portions according to the present embodiment is particularly suitable for the air conditioner 100 which has the top side guide surface 10aa described above.

Second Embodiment

Figure 7:
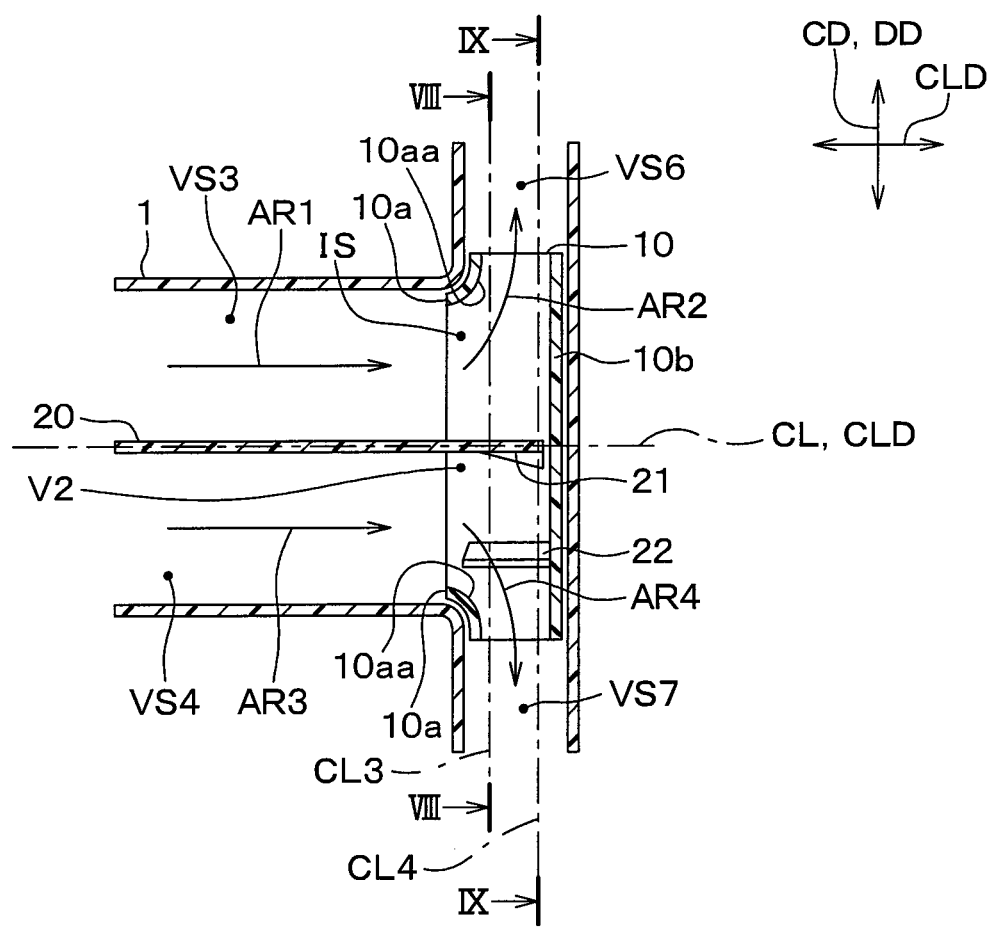
FIG. 7 is a diagram of a peripheral portion of a fan included in an air conditioner according to at least one embodiment of the present disclosure, showing a configuration in FIG. 8 or in a cross section taken along a line VII-VII in FIG. 8.

A second embodiment will be hereinafter described with reference to FIGS. 7 to 9. The inner guide plate 21, the outer guide plate 22, and the outer guide plate of the present embodiment are modifications of the corresponding configurations of the first embodiment. Other configurations are similar to the corresponding configurations of the first embodiment, wherefore basically only the differences from the first embodiment will be touched upon herein.

Figure 8:
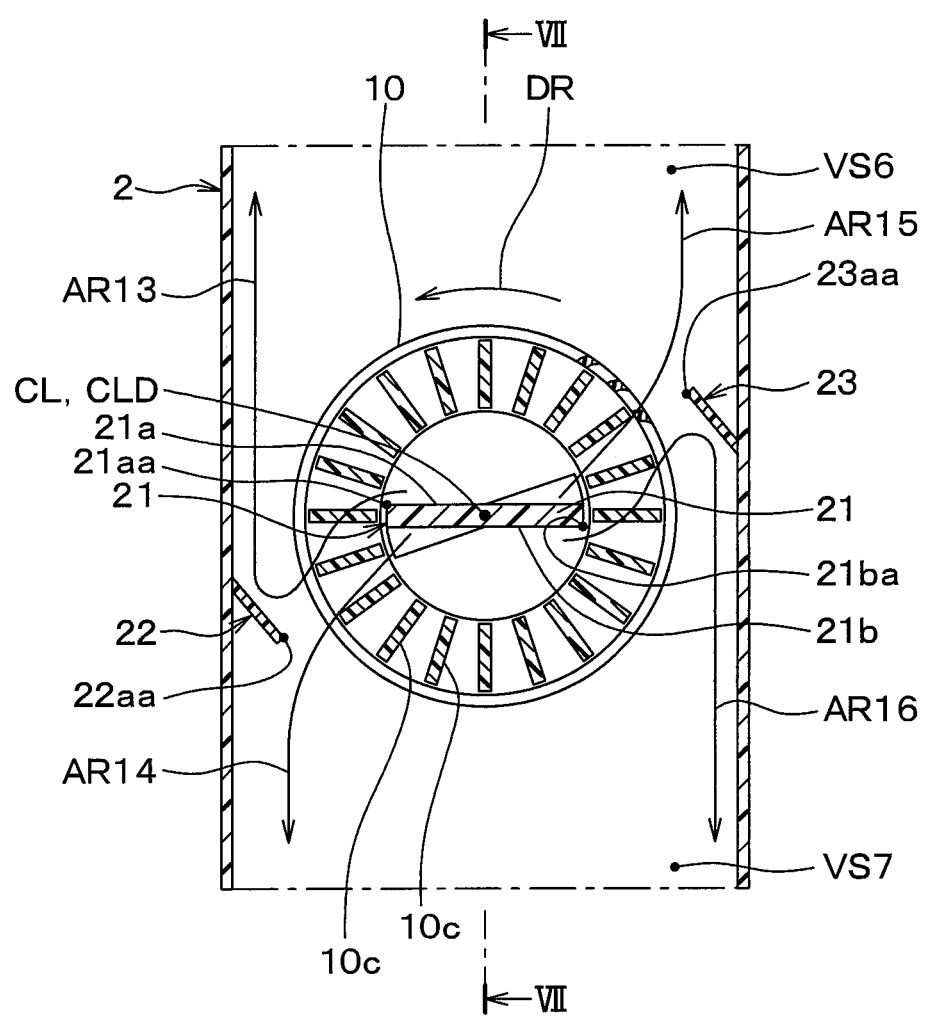
FIG. 8 is a diagram showing a configuration of a cross section taken along a line VIII-VIII in FIG. 7.
Figure 9:
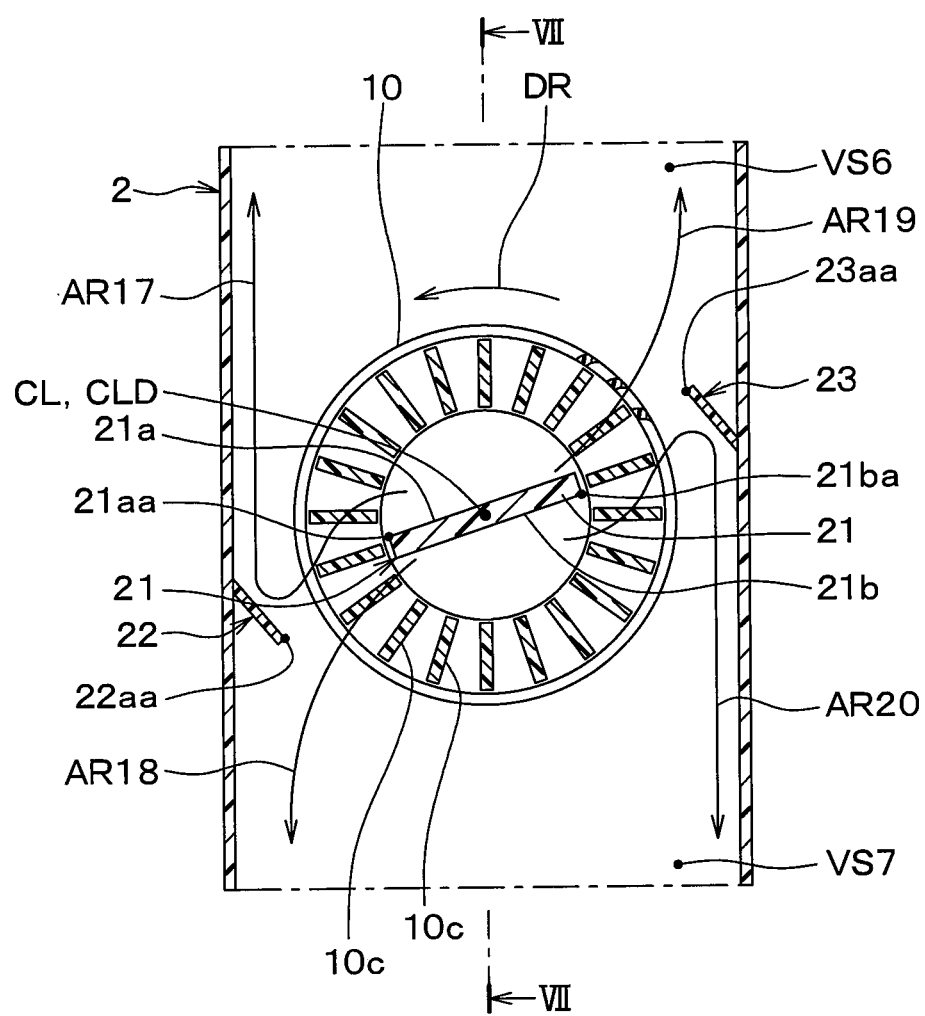
FIG. 9 is a diagram showing a configuration of a cross section taken along a line IX-IX in FIG. 7.

As shown in FIGS. 8 and 9, an end of the inner guide surface 21a on the side close to the outer guide end 22aa of the outer guide plate 22 in the radial direction DD in the predetermined cross section is hereinafter referred to as an inner guide end 21aa. An end of the inner guide surface 21b on the side close to the outer guide end 23aa of the outer guide plate 23 in the radial direction DD in the predetermined cross section is hereinafter referred to as an inner guide end 21ba. Arrows AR13 and AR15 in FIG. 8 each indicate a flow of the first air. Arrows AR14 and AR16 in FIG. 8 each indicate a flow of the second air. Arrows AR17 and AR19 in FIG. 9 each indicate a flow of the first air. Arrows AR18 and AR20 in FIG. 9 each indicate a flow of the second air.

According to the first embodiment, the inner guide plate 21 has a flat plate shape, and is disposed such that the guide surface 21a extends in a direction parallel to the rotation axis CL. According to the present embodiment, however, the lower side of the flat plate shape of the inner guide plate 21 is bent in the rotation direction DR of the fan as shown in FIGS. 7 to 9. More specifically, the inner guide plate 21 of the present embodiment has such a bent shape that the inner guide end 21aa shifts in the rotation direction DR of the fan 10 with nearness to the lower side from the upper side. Moreover, the inner guide plate 21 of the present embodiment has such a bent shape that the inner guide end 21ba shifts in the rotation direction DR of the fan 10 with nearness to the lower side from the upper side. In other words, the inner guide plate 21 is twisted in the rotation direction DR with nearness to the lower side from the upper side.

According to the first embodiment, the lower side of the flat plate shape of each of the outer guide plate 22 and the outer guide plate 23 is bent. According to the present embodiment, however, the outer guide plate 22 of the present embodiment has a flat-plate shape extending in a direction parallel to the rotation axis CL. More specifically, the outer guide plate 22 of the present embodiment has a flat plate shape, and is disposed such that the guide surface 22a extends in a direction parallel to the rotation axis CL. According to the present embodiment, the outer guide plate 23 also has a flat-plate shape extending in a direction parallel to the rotation axis CL. More specifically, the outer guide plate 23 of the present embodiment also has a flat plate shape, and is disposed such that the guide surface 23a extends in a direction parallel to the rotation axis CL.

According to the present embodiment, the inner guide plate 21 and the outer guide plate 22 are configured as described above. In this case, the phase difference angle PA21 shown in FIG. 9 becomes smaller than the phase difference angle PA11 shown in FIG. 8 similarly to the first embodiment. Accordingly, the air conditioning case 2 of the present embodiment has such a configuration that the phase difference angle PA21 at the predetermined position CL2 on the lower side is smaller than the phase difference angle PA11 at the predetermined position CL1 on the upper side. More specifically, the air conditioning case 2 of the present embodiment is configured such that the phase difference angle decreases with nearness to the lower side from the upper side. The phase difference angle PA11 is set such that the outer guide end 22aa is located at a position close to the boundary between the first air and the second air in the predetermined cross section corresponding to the predetermined position CL1. The phase difference angle PA21 is set such that the outer guide end 22aa is located at a position close to the boundary between the first air and the second air in the predetermined cross section corresponding to the predetermined position CL2. According to the air conditioner 100 of the present embodiment, therefore, the phase difference angle of the phase change portions 21a and 22a decreases with nearness to the lower side from the upper side similarly to the first embodiment.

More specifically, according to the present embodiment, there are provided the phase change portions 21a and 22a which form different phase difference angles at different positions in the direction CLD of the rotation axis CL similarly to the first embodiment. In case of the phase change portions 21a and 22aa of the present embodiment, the inner guide end 21aa shifts in the rotation direction DR1 with nearness to the lower side from the upper side. Accordingly, the phase difference angle decreases with nearness to the lower side from the upper side similarly to the first embodiment.

Accordingly, for a reason similar to that of the first embodiment, the air conditioner 100 including the phase change portions 21a and 22a of the present embodiment can cope with upper air having a small speed component in the centrifugal direction CD, and lower air having a large speed component in the centrifugal direction CD. The first air and the second air therefore can be appropriately separated on the lower side as shown in FIG. 9. Furthermore, the phase difference angle increases with nearness to the upper side. In this case, the first air flowing to a position advanced in the rotation direction can be securely guided by the guide surface 22a of the outer guide plate 22 also on the upper side as shown in FIG. 8, wherefore the first air and the second air can be appropriately separated.

According to the present embodiment, the phase difference angle PA22 shown in FIG. 9 is smaller than the phase difference angle PA12 shown in FIG. 8 similarly to the first embodiment. Accordingly, the air conditioning case 2 of the present embodiment has such a configuration that the phase difference angle PA22 at the predetermined position CL2 on the lower side is smaller than the phase difference angle PA12 at the predetermined position CL1 on the upper side. More specifically, the air conditioning case 2 of the present embodiment is configured such that the phase difference angle decreases with nearness to the lower side from the upper side. The phase difference angle PA12 is set such that the outer guide end 23aa is located at a position close to the boundary between the first air and the second air in the predetermined cross section corresponding to the predetermined position CL1. The phase difference angle PA22 is set such that the outer guide end 23aa is located at a position close to the boundary between the first air and the second air in the predetermined cross section corresponding to the predetermined position CL2. According to the air conditioner 100 of the present embodiment, therefore, the phase difference angle formed by the phase change portions 21a and 23a decreases with nearness to the lower side from the upper side similarly to the first embodiment.

More specifically, according to the present embodiment, there are provided the phase change portions 21a and 23a which form different phase difference angles at different positions in the direction CLD of the rotation axis CL similarly to the first embodiment. In case of the phase change portions 21a and 23aa of the present embodiment, the inner guide end 21ab shifts in the rotation direction DR1 with nearness to the lower side from the upper side. Accordingly, the phase difference angle decreases with nearness to the lower side from the upper side similarly to the first embodiment.

Accordingly, for a reason similar to that of the first embodiment, the air conditioner 100 including the phase change portions 21a and 23a of the present embodiment can cope with upper air having a small speed component in the centrifugal direction CD, and lower air having a large speed component in the centrifugal direction CD. The first air and the second air therefore can be appropriately separated on the lower side as shown in FIG. 9. Furthermore, the phase difference angle increases with nearness to the upper side. In this case, the first air flowing to a position advanced in the rotation direction can be securely guided by the guide surface 23a of the outer guide plate 22 also on the upper side as shown in FIG. 8, wherefore the first air and the second air can be appropriately separated.

Different Embodiments

The present disclosure is not limited to the embodiments described above, but may be modified in appropriate manners.

For example, each of the outer guide plates 22 and 23 of the above embodiments may be bent similarly to the first embodiment, and the inner guide plate 21 may also be bent similarly to the second embodiment. More specifically, each of the outer guide plates 22 and 23 of the above embodiments may have such a bent shape that the outer guide end 22aa shifts in the direction opposite to the rotation direction DR of the fan 10 with nearness to the lower side from the upper side. In addition, the inner guide plate 21 may have such a bent shape that the inner guide end 21aa shifts in the rotation direction DR of the fan 10 with nearness to the lower side from the upper side. In this case, separation between the first air and the second air is appropriately achievable similarly to the first and second embodiments by adopting the configuration which includes the phase change portions forming different phase difference angles at different positions in the direction CLD of the rotation axis CL.

According to the first and second embodiments, the phase change portions are formed such that the phase difference angle decreases with nearness to the lower side from the upper side so as to cope with the upper air having a small speed component in the centrifugal direction CD, and the lower air having a large speed component in the centrifugal direction CD.

However, the upper air may have a large speed component in the centrifugal direction CD, while the lower air may have a small speed component in the centrifugal direction CD. According to a study of the inventor of the present application, it has been confirmed that an opposite condition, i.e., the upper air included in the internal space of the fan and having a large speed component in the centrifugal direction, and the lower air included in the internal space of the fan and having a small speed component in the centrifugal direction, may be produced depending on the shape of the fan or the structure of the discharge port. For example, this condition is produced when a member or the like which generates flow resistance is provided on the discharge port side.

Figure 21:
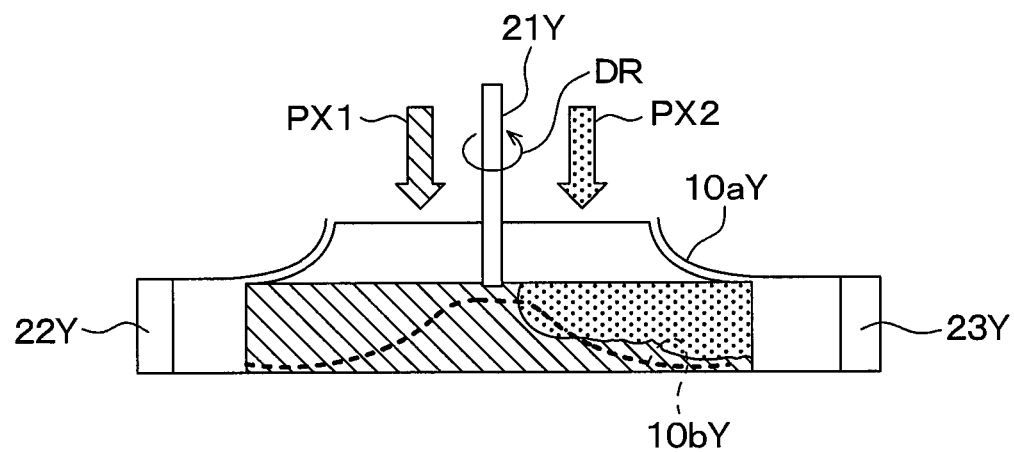
FIG. 21 is a diagram showing flows of first and second airs in a comparative example.

For example, this condition is also produced when a bottom plate portion 10bY of a fan 10Y has a fan boss as shown in a comparative example of FIG. 21. In this case, a portion included in the top plate portion 10aY side surface of the bottom plate portion 10bY and located relatively close to the rotation axis of the fan 10Y protrudes toward the top plate portion 10aY with respect to a portion relatively far from the rotation axis of the fan 10Y.

The comparative example shown in FIG. 21 will be hereinafter described. This comparative example adopts an inner guide plate 21Y and outer guide plates 22Y and 23Y each constituted by a plate-shaped member extending in a direction parallel to the rotation axis. In this comparative example, the fan 10Y, the top plate portion 10aY, the bottom plate portion 10bY, the inner guide plate 21Y, the outer guide plate 22Y, and the outer guide plate 23Y have functions substantially equivalent to the functions of the fan 10, the top plate portion 10a, the bottom plate portion 10b, the inner guide plate 21, the outer guide plate 22, and the outer guide plate 23 of the first embodiment.

As described above, the portion included in the top plate portion 10aY side surface of the bottom plate portion 10bY and located relatively close to the rotation axis of the fan 10Y protrudes toward the top plate portion 10aY with respect to the portion relatively far from the rotation axis of the fan 10Y. In addition, each of the inner guide plate 21Y, the outer guide plate 22Y, and the outer guide plate 23Y is a flat plate member extending in a direction parallel to the rotation axis, unlike the corresponding components in the above embodiment. In FIG. 21, a plurality of blade portions of the fan 10Y are not shown.

FIG. 21 shows distributions of first air PY1 and second air PY2 at an air outlet of the fan 10Y, i.e., at a position farthest from the rotation axis of the fan 10Y in a space surrounded by the plurality of blade portions of the fan 10Y. An existence region of the first air PY1 is expressed by oblique hatching, while an existence region of the second air PY2 is expressed by point hatching. The first air PY1 and the second air PY2 each have properties equivalent to those of the first air and the second air of the embodiments described above.

According to this comparative example, the speed component of the lower air in the centrifugal direction becomes smaller than the speed component of the upper air in the centrifugal direction. Accordingly, a smaller amount of the air flowing in the vicinity of the boundary between the first air PY1 and the second air PY2 on the upper side moves in the rotation direction than the amount of the air flowing in the vicinity of the boundary between the first air PY1 and the second air PY2 on the lower side and moving in the rotation direction. The air moving in the rotation direction on the upper side is then discharged to the outside of the fan.

Accordingly, air guided by the first inner guide surface of the inner guide plate and flowing toward the outer guide plate on the upper side is not guided by the outer guide plate but flows to the discharge port in some cases. For a similar reason, the two types of air PY1 and PY2 are difficult to appropriately separate on the lower side when the outer guide plates 22Y and 23Y are located at positions close to the boundary between the two types of air on the upper side as in the comparative example of FIG. 21.

Figure 10:
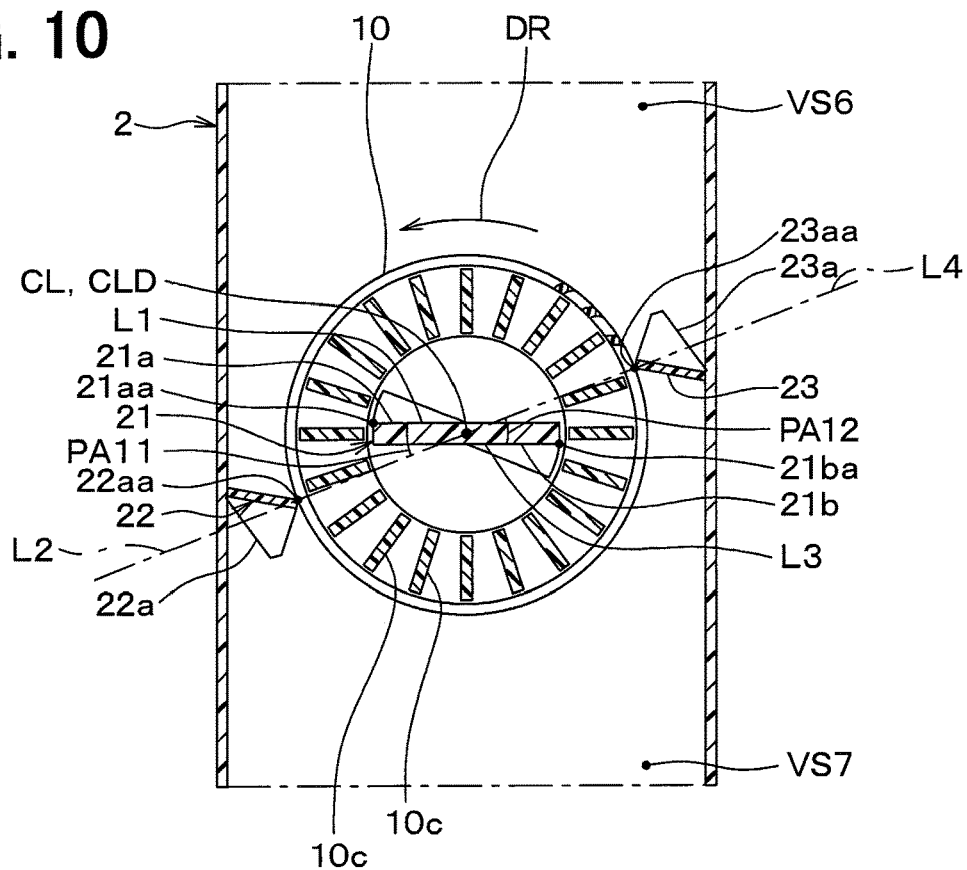
FIG. 10 is a diagram showing an air conditioner according to a different embodiment, and corresponding to FIG. 3 of the first embodiment.
Figure 11:
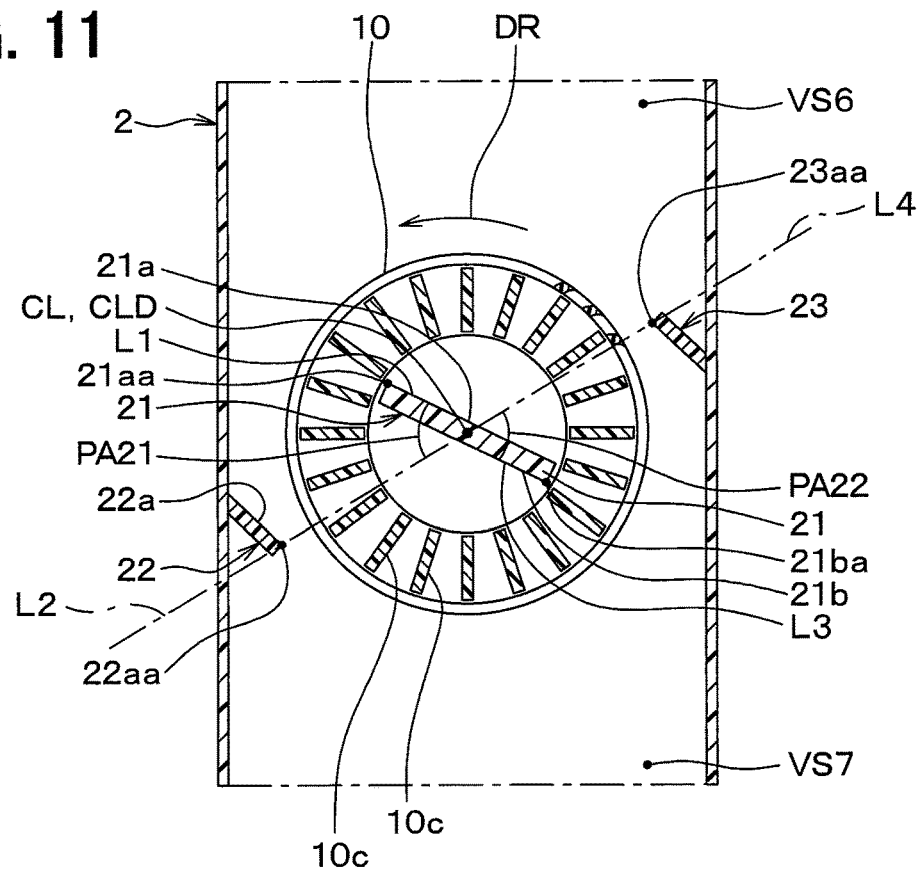
FIG. 11 is a diagram showing the air conditioner shown in FIG. 10, and corresponding to FIG. 4 of the first embodiment.

For overcoming this problem, the air conditioner 100 according to the first and second embodiments may include phase change portions formed such that a phase difference angle increases with nearness to the lower side from the upper side as shown in FIGS. 10 and 11. FIG. 10 is a diagram showing this different embodiment, and corresponding to FIG. 3 of the first embodiment. More specifically, FIG. 10 shows a cross-sectional configuration of a peripheral portion of the fan 10 in the air conditioning case 2, taken at a predetermined position on the upper side in the direction CLD of the rotation axis CL. FIG. 11 is a diagram corresponding to FIG. 4 of the first embodiment. More specifically, FIG. 11 shows a cross-sectional configuration of a peripheral portion of the fan 10 in the air conditioning case 2, taken at a predetermined position on the lower side in the direction CLD of the rotation axis CL. According to this different embodiment, therefore, the outer guide plates 22 and 23 have such a bent shape that the outer guide ends 22aa and 23aa shift in the rotation direction DR of the fan 10 with nearness to the lower side from the upper side. In other words, the outer guide plates 22 and 23 are twisted in the rotation direction DR with nearness to the lower side from the upper side.

In addition, the inner guide plate 21 has such a bent shape that the inner guide ends 21aa and 21ba shift in the direction opposite to the rotation direction DR of the fan 10 with nearness to the lower side from the upper side. In other words, the inner guide plate 21 is twisted in the direction opposite to the rotation direction DR with nearness to the lower side from the upper side. In this manner, the phase change portions are configured such that the phase difference angle increases with nearness to the lower side from the upper side. According to this configuration, the first air and the second air can be appropriately separated on the upper side. Furthermore, the phase difference angle increases with nearness to the lower side. In this case, the first air flowing to a position advanced in the rotation direction DR is securely guided by the outer guide surfaces 22a and 23a also on the lower side, wherefore the first air and the second air can be appropriately separated.

In the mode shown in FIGS. 10 and 11, the surface of the bottom plate portion 10b on the top plate portion 10a side is a flat surface. However, in the example of FIGS. 10 and 11, the surface of the bottom plate portion 10b on the top plate portion 10a side in the surface of the bottom plate portion 10b on the top plate portion 10a side may be modified into a protruding shape. More specifically, a portion relatively close to the rotation axis of the fan 10 may have a shape protruding toward the top plate portion 10a with respect to a portion away from the rotation axis of the fan 10.

In this embodiment (i.e., mode shown in FIGS. 10 and 11), either the inner guide plate 21 or the outer guide plates 22 and 23 may have a flat plate shape extending in a direction parallel to the rotation axis CL. In this case, effects similar to the effects described above can be produced by providing phase change portions configured such that the phase difference angle increases with nearness to the lower side from the upper side.

Figure 12:
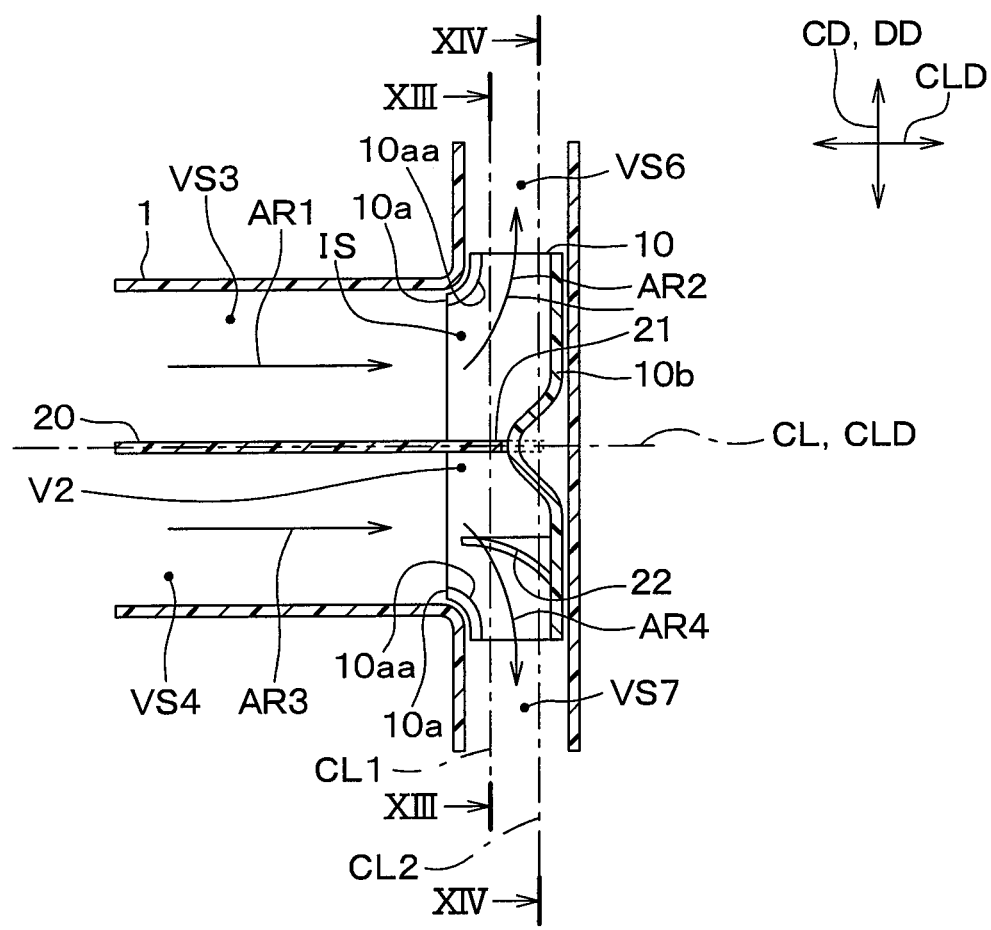
FIG. 12 is a cross-sectional diagram of the air conditioner according to the different embodiment, taken along the same cross section as that of FIG. 2.
Figure 13:
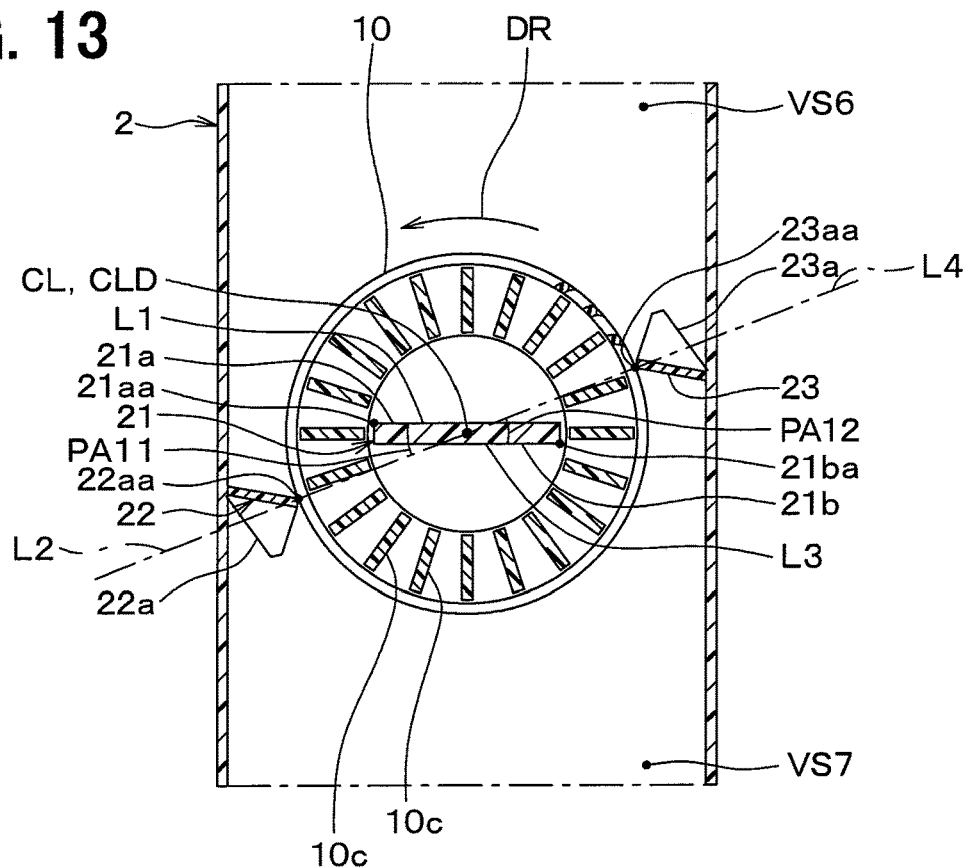
FIG. 13 is a diagram showing a configuration of a cross section taken along a line XIII-XIII in FIG. 13.
Figure 14:
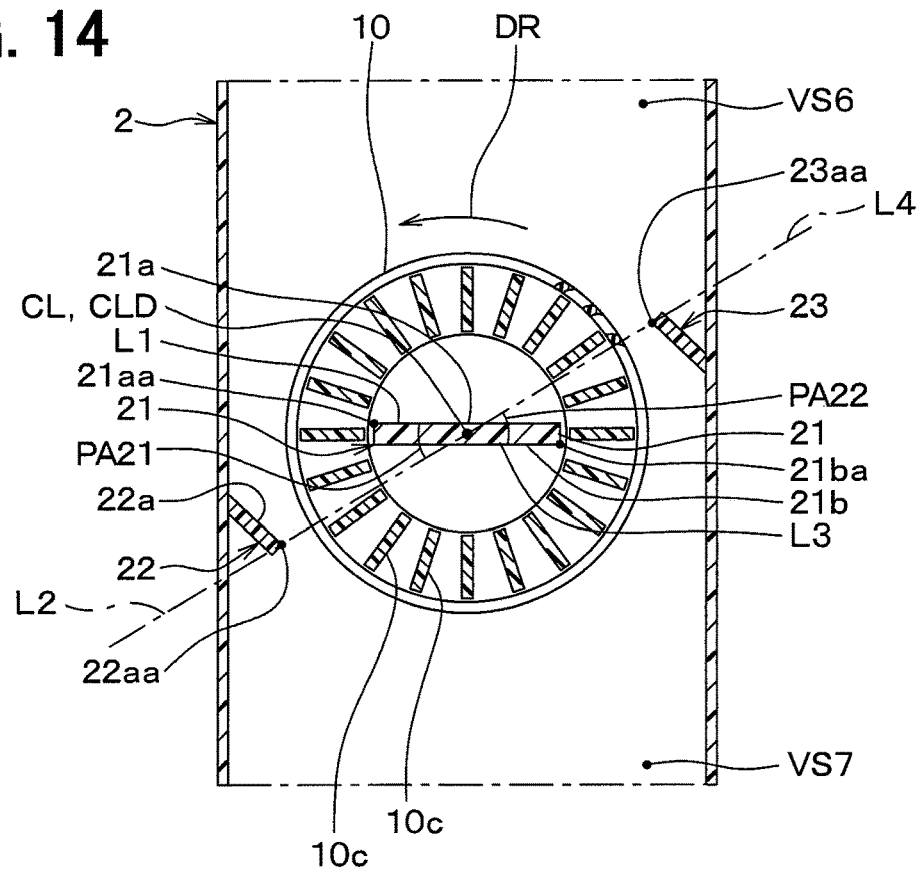
FIG. 14 is a diagram showing a configuration of a cross section taken along a line XIV-XIV in FIG. 13.
Figure 15:
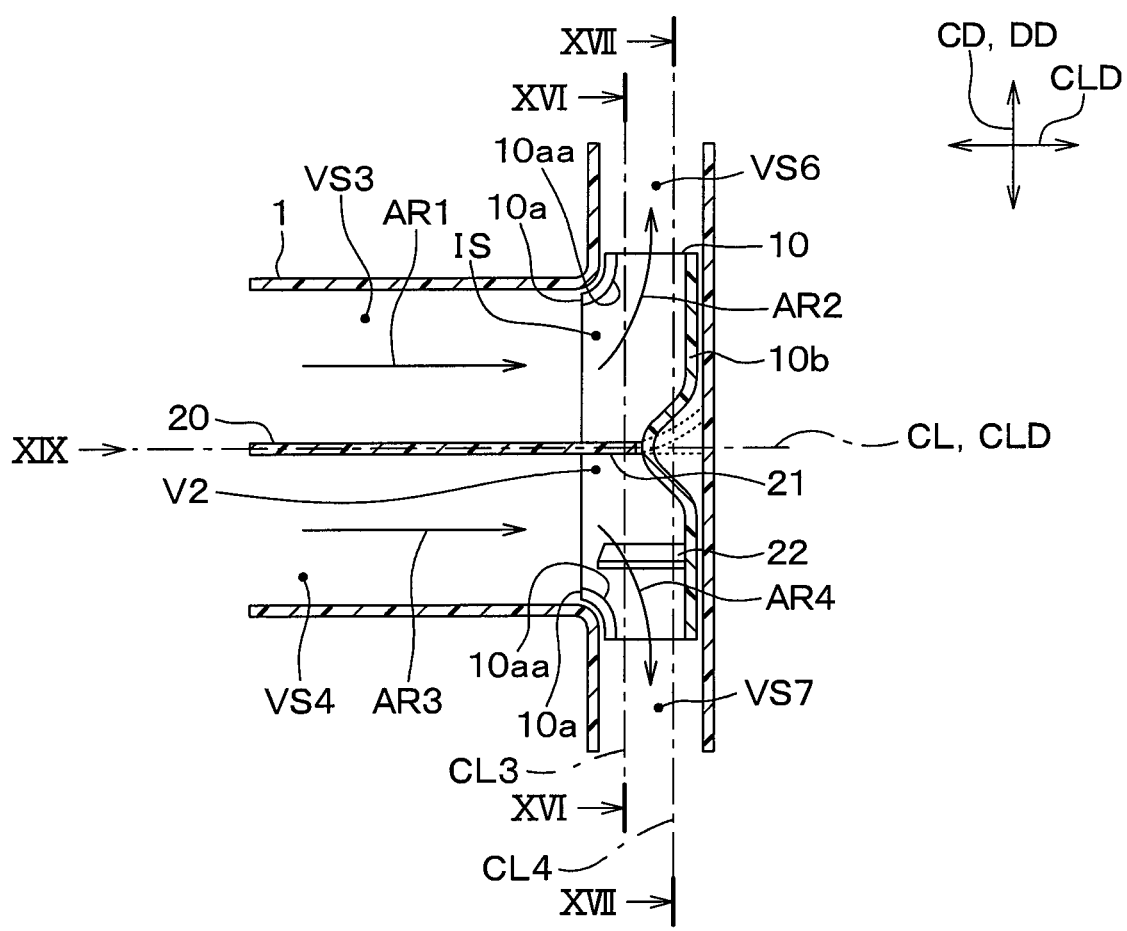
FIG. 15 is a cross-sectional diagram of an air conditioner according to a different embodiment, taken along the same cross section as that of FIG. 2.
Figure 16:
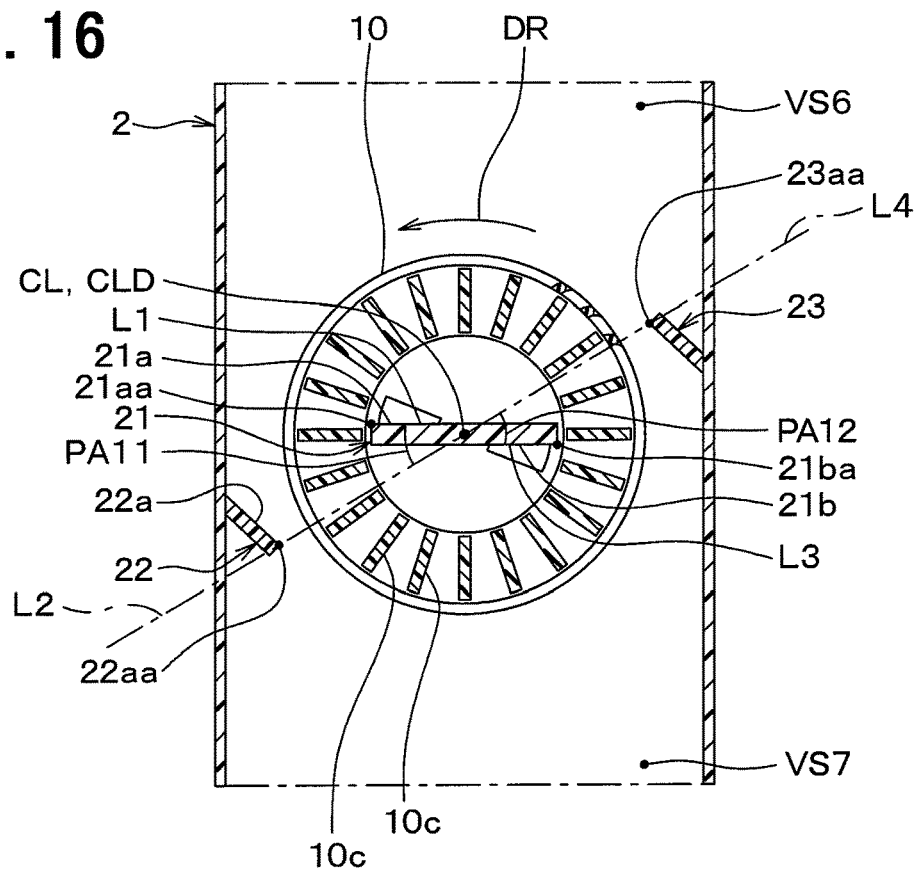
FIG. 16 is a diagram showing a configuration of a cross section taken along a line XVI-XVI in FIG. 15.
Figure 17:
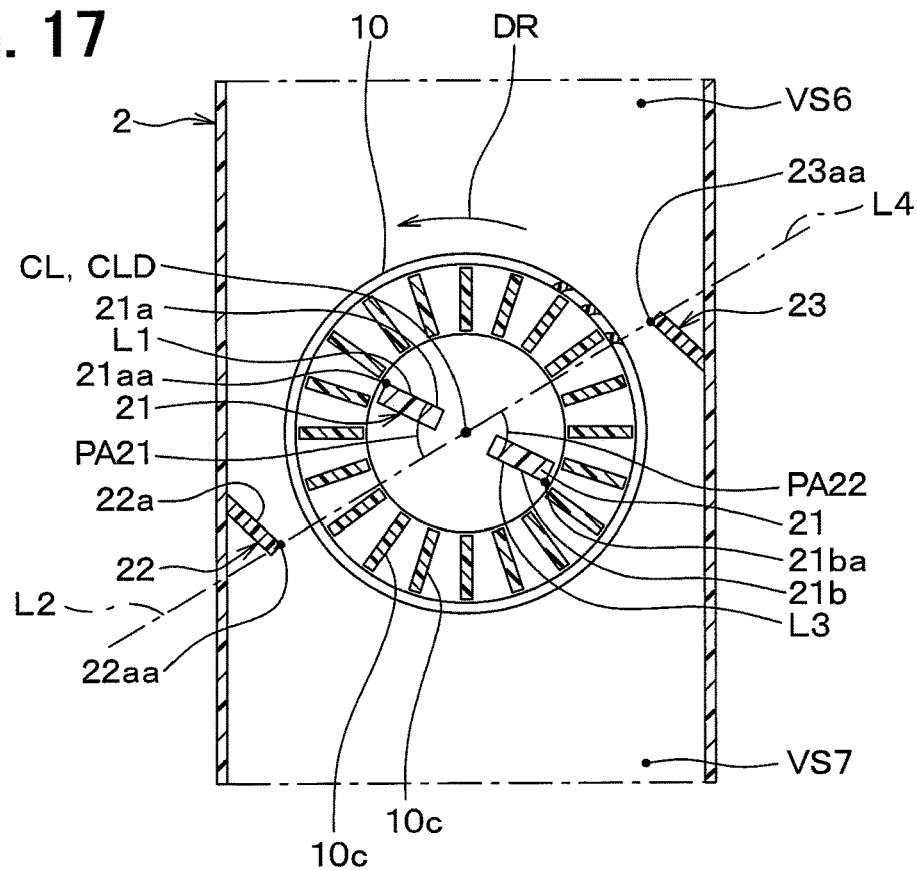
FIG. 17 is a diagram showing a configuration of a cross section taken along a line XVII-XVII in FIG. 15.

For example, in case of the example of FIGS. 10 and 11, the surface of the bottom plate portion 10b on the top plate portion 10a side may have a protruding shape as described above, and the inner guide plate 21 may have a flat plate shape extending in a direction parallel to the rotation axis CL similarly to the first embodiment as shown in FIGS. 12, 13, and 14.

In the example of FIGS. 12, 13, and 14, the outer guide plates 22 and 23 are similarly twisted in the rotation direction DR with nearness to the lower side from the upper side. Accordingly, the air conditioner 100 has the phase change portions 21a and 22a which form different phase difference angles at different positions in the direction CLD of the rotation axis CL. More specifically, the phase change portions 21a and 22a form such a phase difference angle which increases with nearness to the lower side from the upper side.

The air conditioner 100 therefore can cope with the upper air having a large speed component in the centrifugal direction CD, and the lower air having a small speed component in the centrifugal direction CD. Accordingly, the first air and the second air can be appropriately separated on the upper side. Furthermore, the phase difference angle increases with nearness to the lower side. In this case, the first air flowing to a position advanced in the rotation direction DR can be securely guided by the guide surface 22a of the outer guide plate 22 also on the lower side, wherefore the first air and the second air can be appropriately separated.

For example, in case of the example of FIGS. 10 and 11, the surface of the bottom plate portion 10b on the top plate portion 10a side may have a protruding shape as described above, and each of the outer guide plates 22 and 23 may be configured similarly to the second embodiment as shown in FIGS. 15, 16, 17, 18, and 19. More specifically, each of the outer guide plates 22 and 23 may have a flat plate shape extending in a direction parallel to the rotation axis CL.

Figure 18:
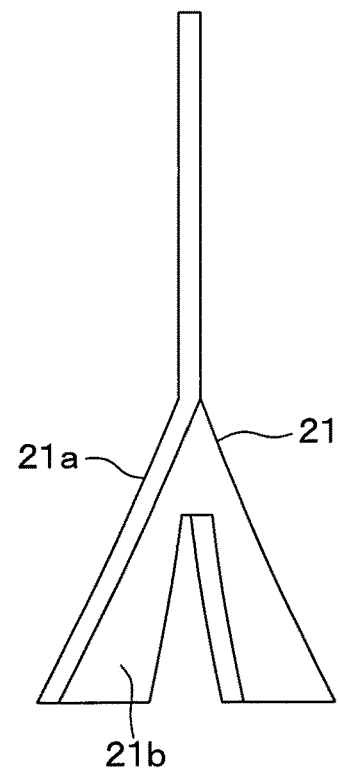
FIG. 18 is a diagram of an inner guide plate as viewed in a direction perpendicular to a plane of paper of FIG. 15 from a front side of the paper.
Figure 19:
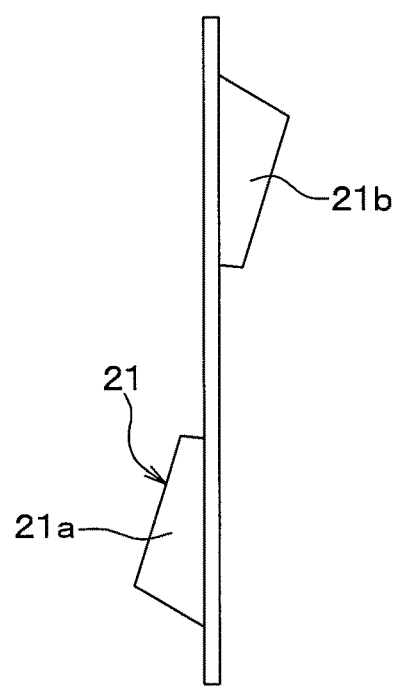
FIG. 19 is a diagram of the inner guide plate as viewed in a XVIV direction in FIG. 15.

In this case, as shown in FIGS. 18 and 19, the inner guide plate 21 is cut along a protruding portion of the surface of the bottom plate portion 10b on the top plate portion 10a side to avoid interference with the protruding portion.

In the example of FIGS. 15, 16, 17, 18, and 19, the inner guide plate 21 is similarly twisted in the direction opposite to the rotation direction DR with nearness to the lower side from the upper side. Accordingly, the air conditioner 100 has the phase change portions 21a and 22a which form different phase difference angles at different positions in the direction CLD of the rotation axis CL. More specifically, the phase change portions 21a and 22a form such a phase difference angle which increases with nearness to the lower side from the upper side.

The air conditioner 100 therefore can cope with the upper air having a large speed component in the centrifugal direction CD, and the lower air having a small speed component in the centrifugal direction CD. Accordingly, the first air and the second air can be appropriately separated on the upper side. Furthermore, the phase difference angle increases with nearness to the lower side. In this case, the first air flowing to a position advanced in the rotation direction DR can be securely guided by the guide surface 22a of the outer guide plate 22 also on the lower side, wherefore the first air and the second air can be appropriately separated.

SUMMARY

In a first aspect shown in a part or all of the above embodiments, the air conditioner has the phase change portion which forms different phase difference angles at different positions in the direction of the rotation axis.

In a second aspect, the phase change portion is formed such that the phase difference angle decreases with nearness to the lower side from the upper side in the air conditioner according to the first aspect. In the extension direction of the rotation axis of the fan, the top plate portion side corresponds to the upper side, while the bottom plate portion side corresponds to the lower side.

The configuration of the second aspect including the phase change portion can cope with upper air having a small speed component in the centrifugal direction, and lower air having a large speed component in the centrifugal direction. Accordingly, the first air and the second air can be appropriately separated on the lower side. Furthermore, the phase difference angle increases with nearness to the upper side. In this case, the first air flowing to a position advanced in the rotation direction can be securely guided by the outer guide surface also on the upper side, wherefore the first air and the second air can be appropriately separated.

In a third aspect, the outer guide end shifts in the direction opposite to the rotation direction with nearness to the lower side from the upper side in the air conditioner according to the second aspect. The phase difference angle therefore decreases with nearness to the lower side from the upper side.

According to the third aspect, the air flowing on the upper side in the internal space of the fan and the air flowing on the lower side in the internal space of the fan collide with the outer guide surface with variance in time and position. Accordingly, noise generated by collision between these airs and the outer guide surface can decrease.

In a fourth aspect, the phase change portion is formed such that the inner guide end shifts in the rotation direction with nearness to the lower side from the upper side in the air conditioner according to the second aspect. The phase difference angle therefore decreases with nearness to the lower side from the upper side. According to the fourth aspect, effects similar to the effects of the first aspect can be produced.

In a fifth aspect, the phase change portion is provided such that the phase difference angle increases with nearness to the lower side from the upper side in the air conditioner according to the first aspect.

According to the fifth aspect, the configuration including the phase change portion is capable of coping with the air flowing on the upper side in the internal space of the fan and having a large speed component in the centrifugal direction, and the air flowing on the lower side in the internal space of the fan and having a small speed component in the centrifugal direction. Accordingly, the first air and the second air can be appropriately separated on the upper side. Furthermore, the phase difference angle increases with nearness to the lower side. In this case, the first air flowing to a position advanced in the rotation direction can be securely guided by the outer guide surface also on the lower side, wherefore the first air and the second air can be appropriately separated.

In a sixth aspect, the phase difference angle increases with nearness to the lower side from the upper side in the air conditioner according to the fifth aspect. According to the sixth aspect, effects similar to the effects of the fifth aspect can be produced.

In a seventh aspect, the inner guide end shifts in the direction opposite to the rotation direction with nearness to the lower side from the upper side in the air conditioner according to the fifth aspect. The phase difference angle therefore increases with nearness to the lower side from the upper side. According to the seventh aspect, effects similar to the effects of the fifth aspect can be produced.

In an eighth aspect, the top plate portion has a top side guide surface along which air passing through the fan introduction port is guided to the first discharge port or the second discharge port in the air conditioner according to any one of the first to eighth aspects. The top side guide surface faces the bottom plate portion, and extends outward in the radial direction of the fan with nearness to the lower side from the upper side in the periphery of the fan introduction port in the radial direction of the fan. According to the eighth aspect, effects similar to the effects of the first to seventh aspects can be effectively produced.

What is claimed is:
1. An air conditioner for feeding conditioned air, the air conditioner comprising:
   a fan; and
   an air conditioning case that defines a ventilation space through which air passes, wherein
   the fan includes a top plate portion, a bottom plate portion, and a plurality of blade portions located between the top plate portion and the bottom plate portion, the fan is disposed in the ventilation space, and rotates to draw the air in a direction along a rotation axis and to blow out the air in a centrifugal direction around the rotation axis, the ventilation space includes a case introduction port through which air outside the air conditioning case is introduced, the air conditioning case includes a partition plate, an inner guide plate, and an outer guide plate, the partition plate partitions a part of the ventilation space extending from the case introduction port into a first passage and a second passage, the ventilation space includes
- a fan space that communicates with the first passage and the second passage, the fan being disposed in the fan space,
- a first discharge port that communicates with the fan space, the air that flows through the first passage and the fan space flowing out of the air conditioning case through the first discharge port,
- a second discharge port that communicates with the fan space, the air that flows through the second passage and the fan space flowing out of the air conditioning case through the second discharge port, the top plate portion defines a fan introduction port through which the air passing through the first passage and the air passing through the second passage are introduced into a space surrounded by the bottom plate portion and the top plate portion, the inner guide plate is disposed in the fan space, the inner guide plate being closer to the rotation axis than the plurality of blade portions are to in a radial direction around the rotation axis, the inner guide plate has an inner guide plate surface along which the air passing through the first passage and blown out from the fan is guided toward the first discharge port or the outer guide plate, the outer guide plate is disposed in the fan space, the outer guide plate being farther from the rotation axis than the plurality of blade portions are from in the radial direction, the outer guide plate has an outer guide plate surface along which the air guided by the inner guide plate surface is guided toward the first discharge port, a plurality of predetermined cross sections are taken along a direction perpendicular to the rotation axis, each of the plurality of predetermined cross sections includes the fan, the plurality of predetermined cross sections are different in positions in the direction along the rotation axis each other, in each of the plurality of predetermined cross sections, a reference line is a line that connects the rotation axis and an outer guide end which is an end of the outer guide surface closer to the rotation axis in the radial direction, in each of the plurality of predetermined cross sections, a guide line is a line that connects the rotation axis and an inner guide end which is an end of the inner guide surface closer to the outer guide end in the radial direction, in each of the plurality of predetermined cross sections, a phase difference angle is defined between the guide line and the reference line in a rotation direction of the fan, and the phase difference angles of the plurality of predetermined cross sections are different from each other.

2. The air conditioner according to claim 1, wherein the phase difference angle decreases with a decrease of a distance to the bottom plate portion in the direction along the rotation axis from the top plate portion.

3. The air conditioner according to claim 2, wherein the outer guide end shifts in a direction opposite to the rotation direction from the top plate portion to the bottom plate portion, and thereby the phase difference angle decreases with the decrease of the distance to the bottom plate portion from the top plate portion.

4. The air conditioner according to claim 2, wherein the inner guide end shifts in the rotation direction from the top plate portion to the bottom plate portion, and thereby the phase difference angle decreases with the decrease of the distance to the bottom plate portion from the top plate portion.

5. The air conditioner according to claim 1, wherein the phase difference angle increases with a decrease of a distance to the bottom plate portion in the direction along the rotation axis from the top plate portion.

6. The air conditioner according to claim 5, wherein, the outer guide end shifts in a direction opposite to the rotation direction from the top plate portion to the bottom plate portion, and thereby the phase difference angle increases with the decrease of the distance to the bottom plate portion from the top plate portion.

7. The air conditioner according to claim 5, wherein, the inner guide end shifts in the rotation direction from the top plate portion to the bottom plate portion, and thereby the phase difference angle increases with the decrease of the distance to the bottom plate portion from the top plate portion.

8. The air conditioner according to claim 1, wherein the top plate portion has a top side guide surface along which the air passing through the fan introduction port is guided toward the first discharge port or the second discharge port, the top side guide surface faces the bottom plate portion, the top side guide surface is located around the fan introduction port in the radial direction, and the top side guide surface extends outward in the radial direction toward the bottom plate portion from the top plate portion.

9. An air conditioner for feeding conditioned air, the air conditioner comprising:

a fan; and an air conditioning case that defines a ventilation space through which air passes, wherein the fan includes a top plate portion, a bottom plate portion, and a plurality of blade portions located between the top plate portion and the bottom plate portion, the fan is disposed in the ventilation space, and rotates to draw the air in a direction along a rotation axis and to blow out the air in a centrifugal direction around the rotation axis, the ventilation space includes a case introduction port through which air outside the air conditioning case is introduced, the air conditioning case includes a partition plate, an inner guide plate, and an outer guide plate, the partition plate partitions a part of the ventilation space extending from the case introduction port into a first passage and a second passage, the ventilation space includes
- a fan space that communicates with the first passage and the second passage, the fan being disposed in the fan space, a first discharge port that communicates with the fan space, the air that flows through the first passage and the fan space flowing out of the air conditioning case through the first discharge port, a second discharge port that communicates with the fan space, the air that flows through the second passage and the fan space flowing out of the air conditioning case through the second discharge port, the top plate portion defines a fan introduction port through which the air passing through the first passage and the air passing through the second passage are introduced into a space surrounded by the bottom plate portion and the top plate portion, the inner guide plate is disposed in the fan space, the inner guide plate being closer to the rotation axis than the plurality of blade portions in a radial direction around the rotation axis, the inner guide plate has an inner guide plate surface along which the air passing through the first passage and blown out from the fan is guided toward the first discharge port or the outer guide plate, the outer guide plate is disposed in the fan space, the outer guide plate being farther from the rotation axis than the plurality of blade portions are from in the radial direction, the outer guide plate has an outer guide plate surface along which the air guided by the inner guide plate surface is guided toward the first discharge port, a plurality of predetermined cross sections are taken along a direction perpendicular to the rotation axis, each of the plurality of predetermined cross sections includes the fan, the plurality of predetermined cross sections are different in positions in the direction along the rotation axis each other, in each of the plurality of predetermined cross sections, a line represented by the inner guide surface is a guide line, in each of the plurality of predetermined cross sections, a reference line is a line that connects the rotation axis and an outer guide end which is and ends of the outer guide surface closer to the rotation axis in the radial direction, in each of the plurality of predetermined cross sections, a phase difference angle is defined between the guide line and the reference line in a rotation direction of the fan, and the phase difference angles of the plurality of predetermined cross sections are different from each other.

* * * * *